United States Patent
Mate et al.

(10) Patent No.: US 8,600,402 B2
(45) Date of Patent: Dec. 3, 2013

(54) METHOD AND APPARATUS FOR DETERMINING ROLES FOR MEDIA GENERATION AND COMPILATION

(75) Inventors: Sujeet Shyamsundar Mate, Tampere (FI); Francesco Cricri, Tampere (FI); Igor Danilo Diego Curcio, Tampere (FI)

(73) Assignee: Nokia Corporation, Espoo (FI)

( * ) Notice: Subject to any disclaimer, the term of this patent is extended or adjusted under 35 U.S.C. 154(b) by 64 days.

(21) Appl. No.: 13/247,585

(22) Filed: Sep. 28, 2011

(65) Prior Publication Data

US 2012/0077522 A1     Mar. 29, 2012

Related U.S. Application Data

(60) Provisional application No. 61/387,358, filed on Sep. 28, 2010.

(51) Int. Cl.
*H04W 24/00*     (2009.01)

(52) U.S. Cl.
USPC ................................ 455/456.1; 455/456.3

(58) Field of Classification Search
USPC .............................. 455/456.1, 456.3; 707/739
See application file for complete search history.

(56) References Cited

U.S. PATENT DOCUMENTS

| | | |
|---|---|---|
| 2006/0184538 A1 | 8/2006 | Randall et al. |
| 2006/0251382 A1 | 11/2006 | Vronay et al. |
| 2009/0089294 A1 | 4/2009 | Davis et al. |
| 2009/0089352 A1 | 4/2009 | Davis et al. |
| 2012/0083285 A1* | 4/2012 | Shatsky et al. ............ 455/456.1 |

* cited by examiner

*Primary Examiner* — Sam Bhattacharya
(74) *Attorney, Agent, or Firm* — Ditthavong Mori & Steiner, P.C.

(57) ABSTRACT

An approach is provided for determining roles for multi-device recording. A media platform determines one or more devices for generating one or more media items of at least one subject and then determines the respective locations of the one or more devices relative to one or more focal areas of the at least one subject. Based, at least in part, on the respective locations, the media platform determines respective roles for the one or more devices for generating the one or more items.

20 Claims, 20 Drawing Sheets

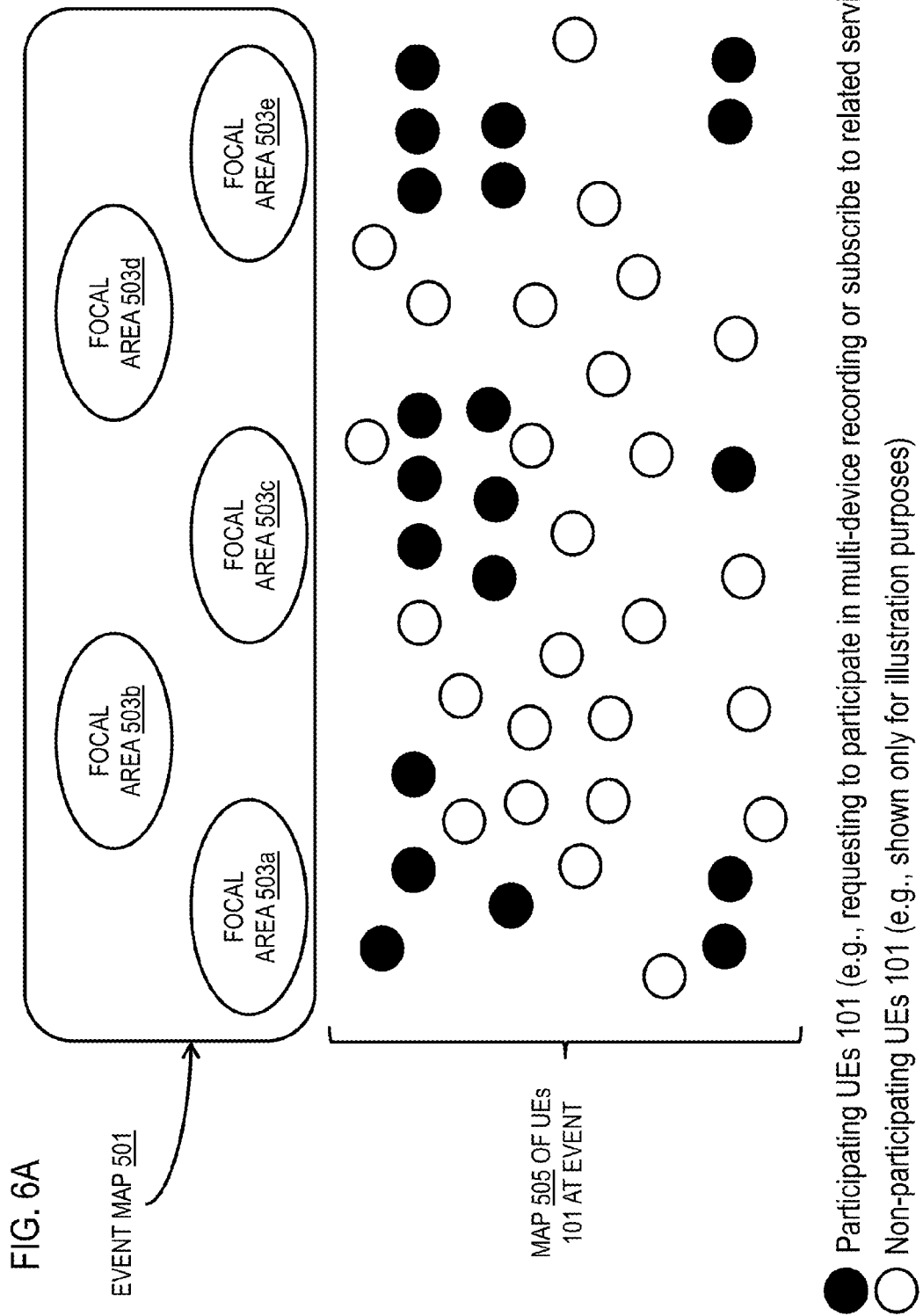

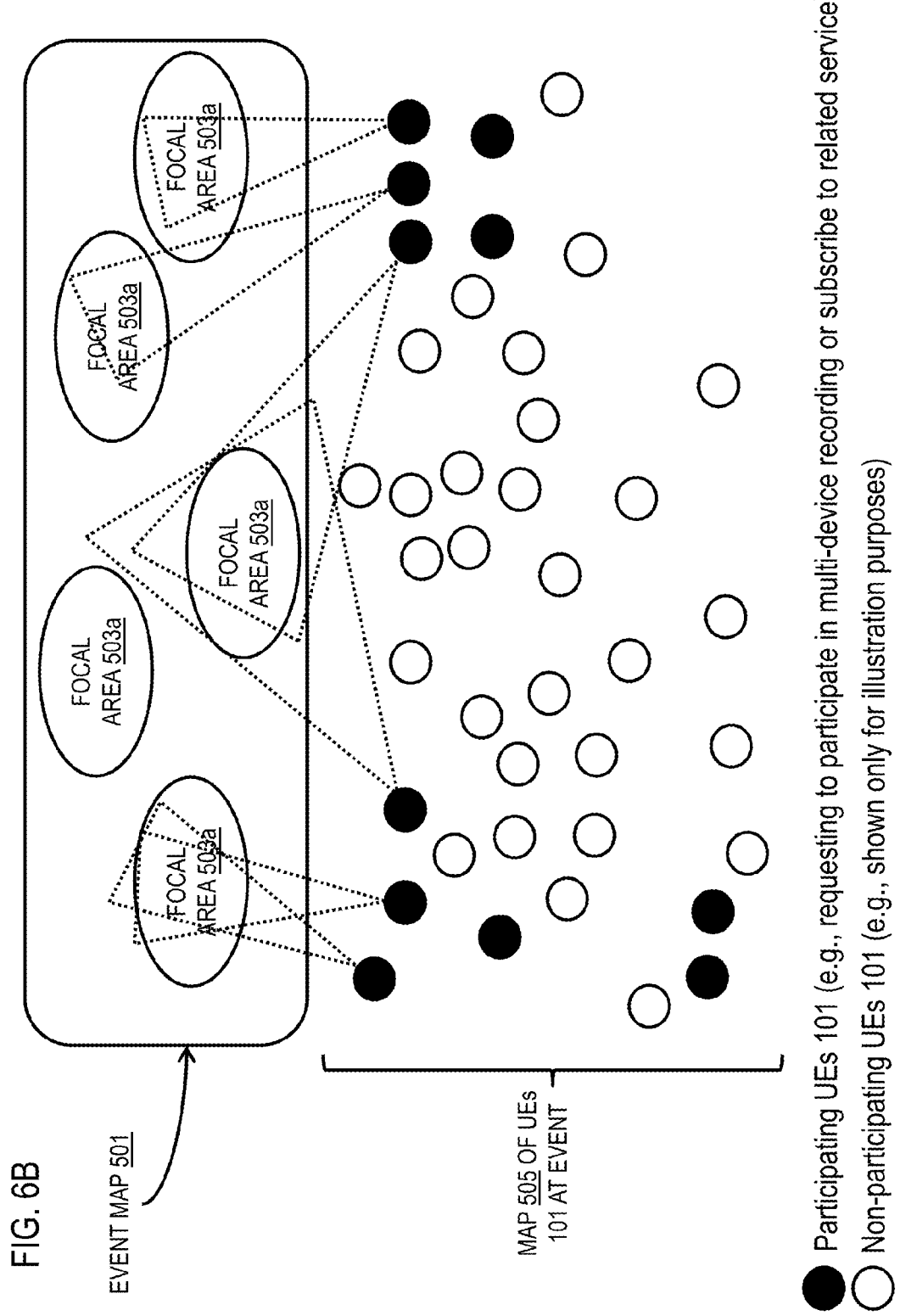

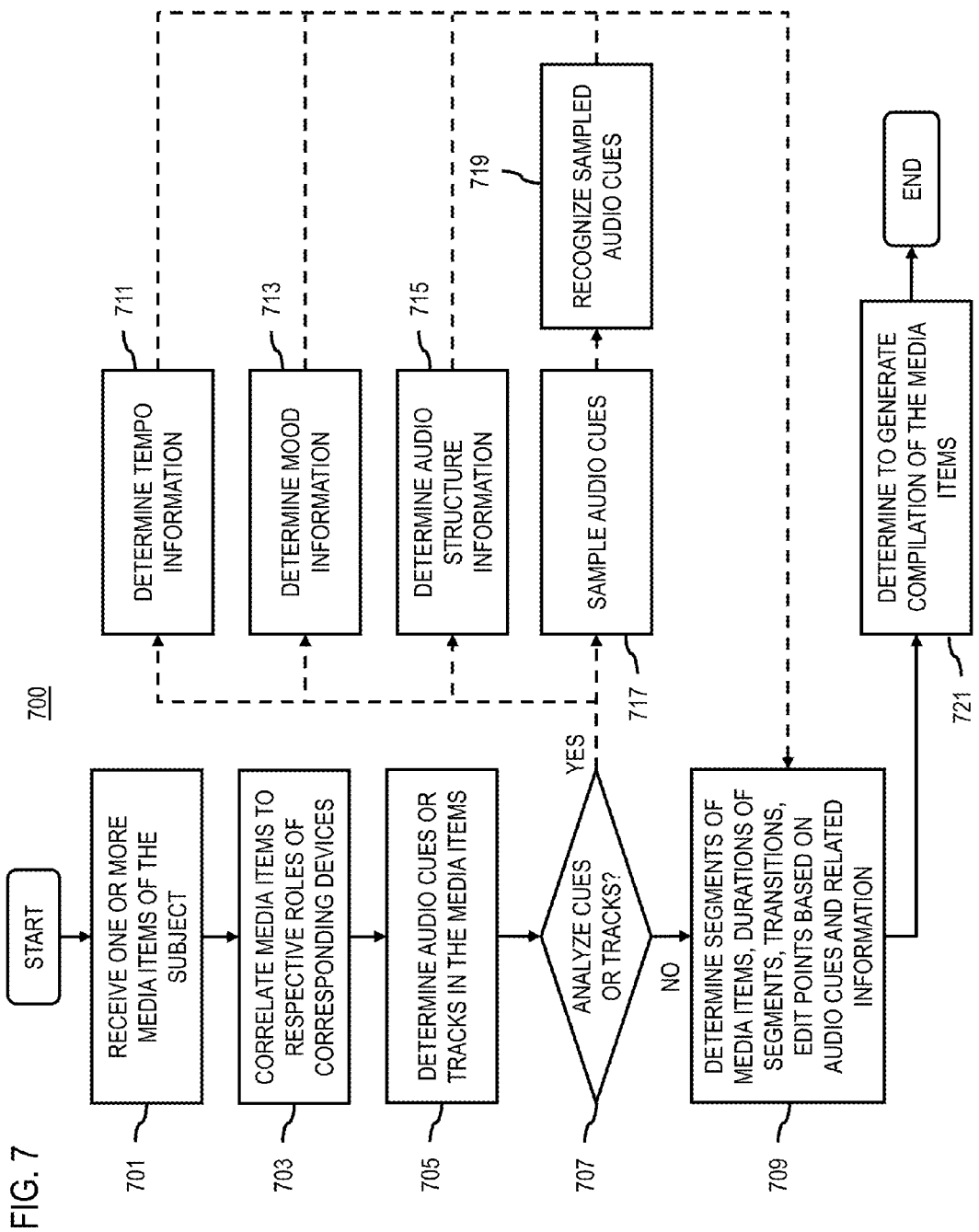

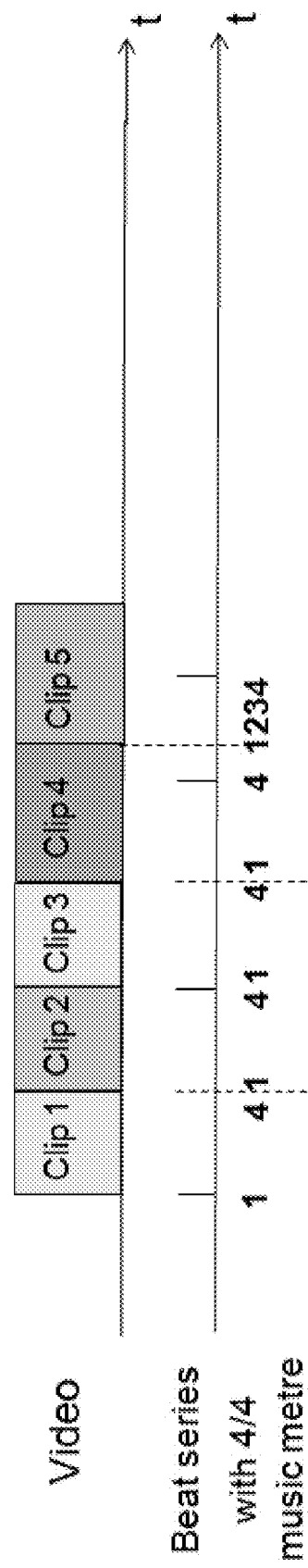

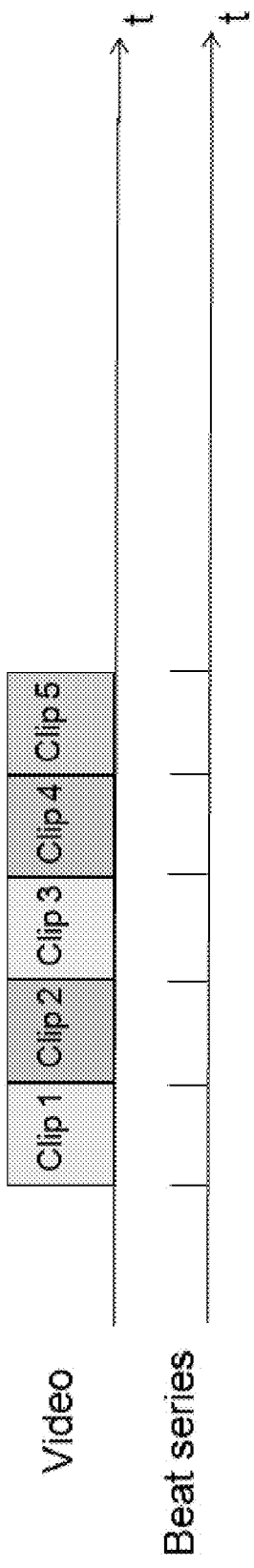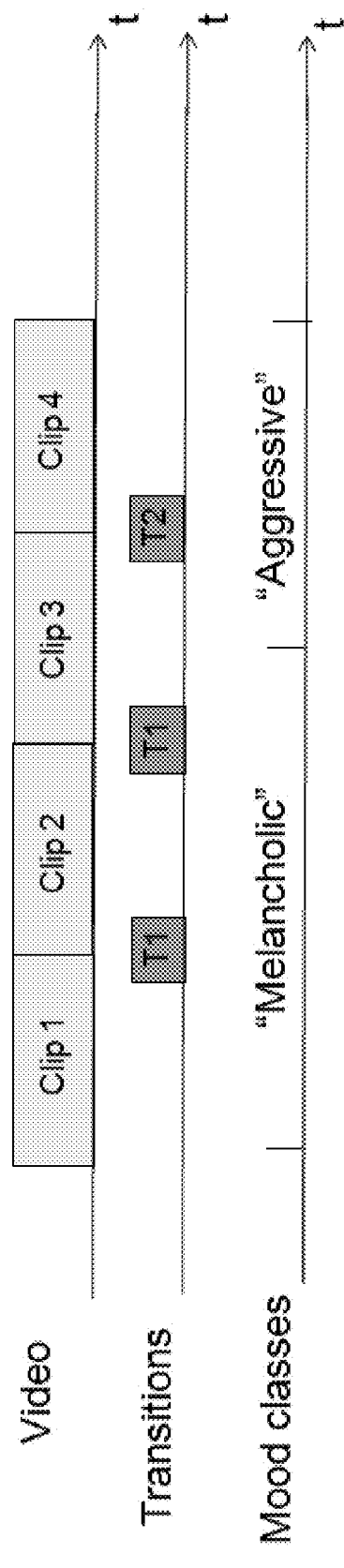

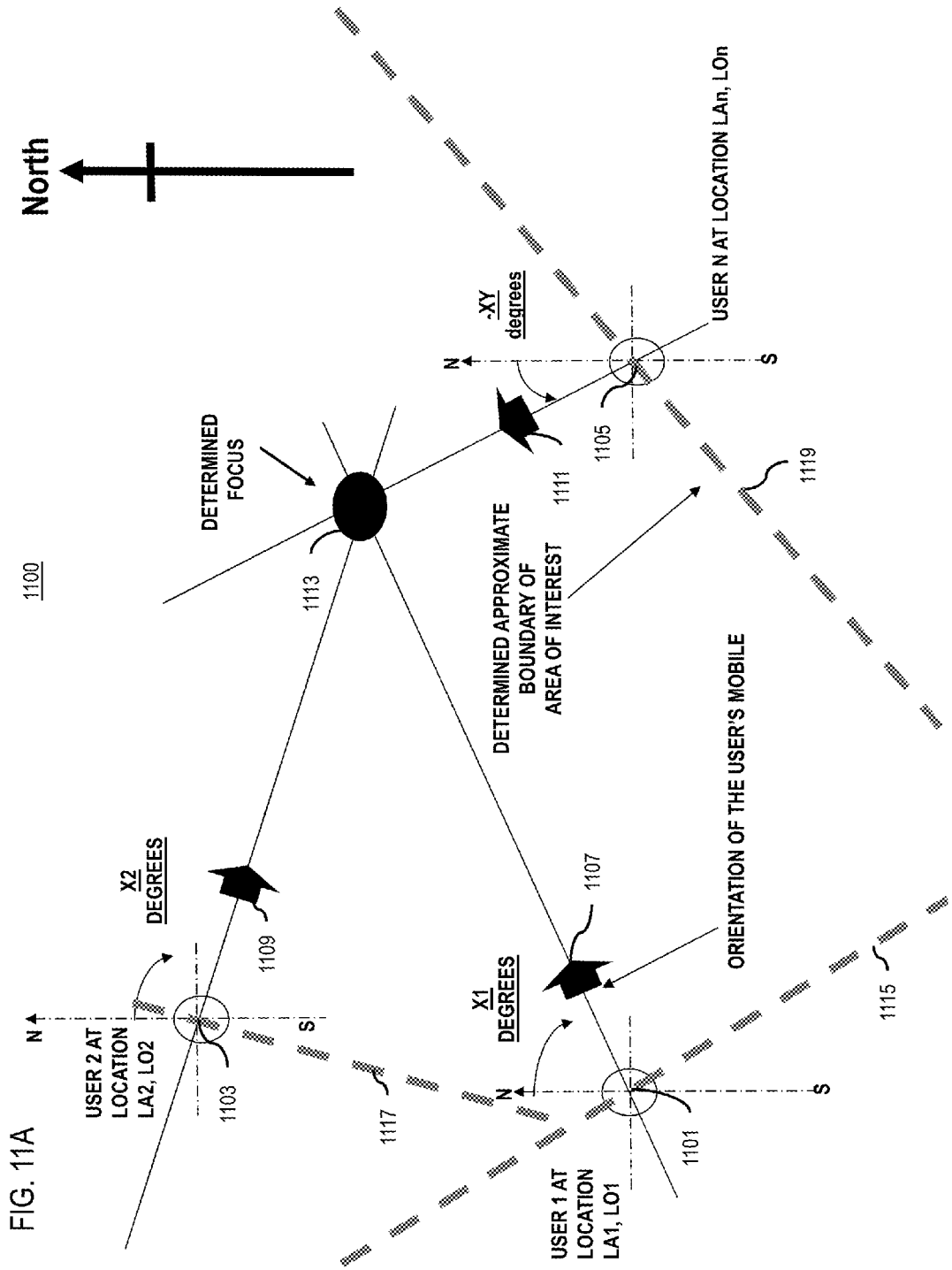

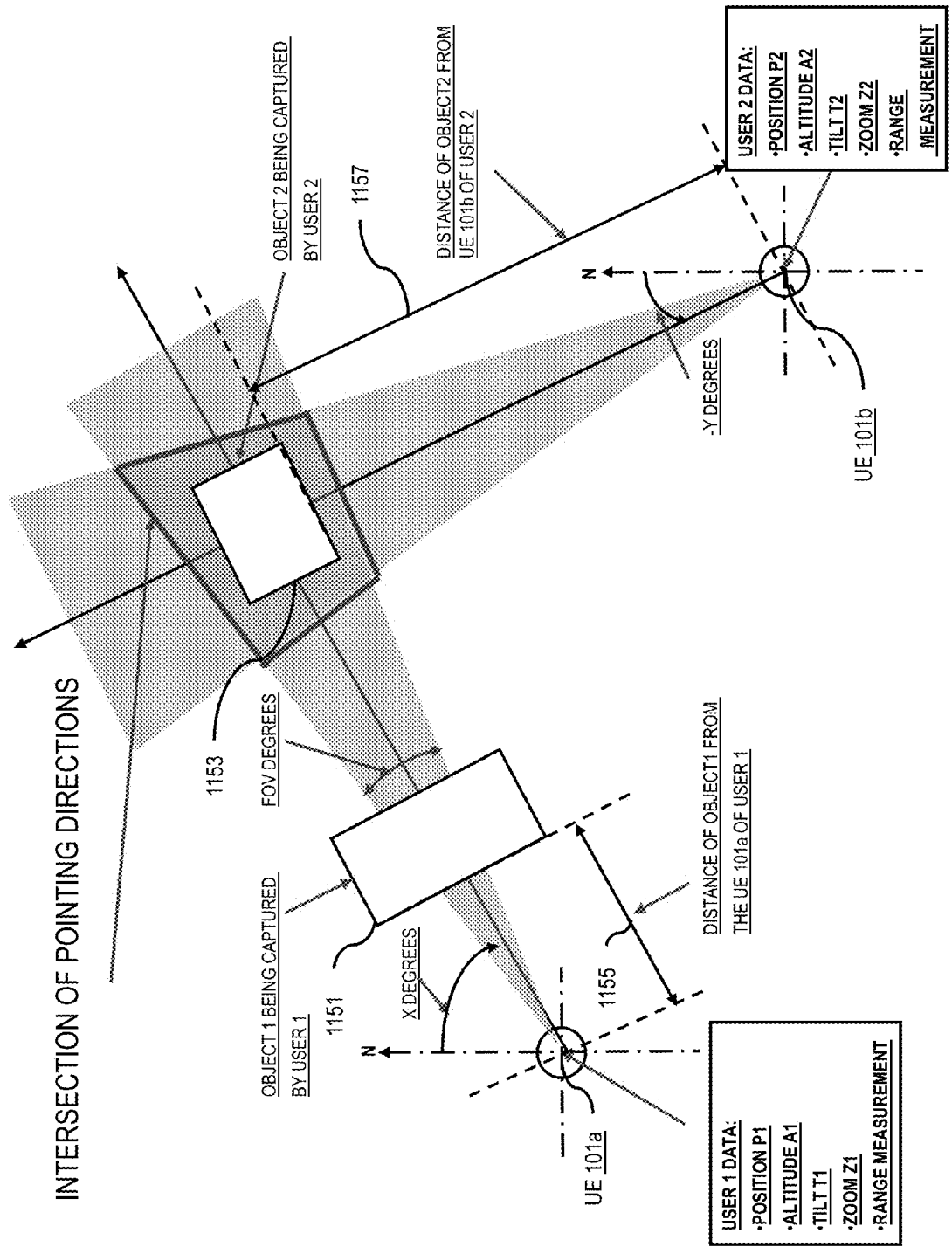

US 8,600,402 B2

METHOD AND APPARATUS FOR DETERMINING ROLES FOR MEDIA GENERATION AND COMPILATION

RELATED APPLICATIONS

This application claims the benefit of the earlier filing date under 35 U.S.C. §119(e) of U.S. Provisional Application Ser. No. 61/387,358 filed Sep. 28, 2010, entitled "Method and Apparatus for Multi-Device Media Capture," the entirety of which is incorporated herein by reference.

BACKGROUND

Service providers and device manufacturers (e.g., wireless, cellular, etc.) are continually challenged to deliver value and convenience to consumers by, for example, providing compelling network services. These services, for instance, often include advancements in multimedia technology that have given rise to an immense increase in the amount of user generated content or media items (e.g., images, videos, audio content, etc.). At the same time, an increasing amount of users are also sharing this content over, for instance, the Internet. As a result, users often share or have media items, recordings, content, etc. related to the same or similar subjects (e.g., events, places, people, objects, etc.). However, this increase in available content has also made it much more difficult for users to access and/or organize the content or recordings that are of particular interest. Accordingly, service providers and device manufacturers face significant technical challenges to enabling users to efficiently compile such content, particularly when the content relate to a common subject, event, theme, and/or the like.

SOME EXAMPLE EMBODIMENTS

Therefore, there is a need for determining roles for media generation and compilation across multiple devices and/or content sources in relation to one or more events.

According to one embodiment, a method comprises determining one or more devices for generating one or more media items of at least one subject. The method also comprises determining respective locations of the one or more devices relative to one or more focal areas of the at least one subject. The method further comprises determining respective roles for the one or more devices based, at least in part, on the respective locations. The respective roles are for at least generating the one or more media items.

According to another embodiment, an apparatus comprises at least one processor, and at least one memory including computer program code, the at least one memory and the computer program code configured to, with the at least one processor, cause, at least in part, the apparatus to determine one or more devices for generating one or more media items of at least one subject. The apparatus is also caused to determine respective locations of the one or more devices relative to one or more focal areas of the at least one subject. The apparatus is further caused to determine respective roles for the one or more devices based, at least in part, on the respective locations. The respective roles are for at least generating the one or more media items.

According to another embodiment, a computer-readable storage medium carries one or more sequences of one or more instructions which, when executed by one or more processors, cause, at least in part, an apparatus to determine one or more devices for generating one or more media items of at least one subject. The apparatus is also caused to determine respective locations of the one or more devices relative to one or more focal areas of the at least one subject. The apparatus is further caused to determine respective roles for the one or more devices based, at least in part, on the respective locations. The respective roles are for at least generating the one or more media items.

According to another embodiment, an apparatus comprises means for determining one or more devices for generating one or more media items of at least one subject. The apparatus also comprises means for determining respective locations of the one or more devices relative to one or more focal areas of the at least one subject. The apparatus further comprises means for determining respective roles for the one or more devices based, at least in part, on the respective locations. The respective roles are for at least generating the one or more media items.

According to another embodiment, a method comprises facilitating access to at least one interface configured to allow access to at least one service, the at least one service configured to determine one or more devices for generating one or more media items of at least one subject. The at least one service is also caused to determine respective locations of the one or more devices relative to one or more focal areas of the at least one subject. The at least one service is further caused to determine respective roles for the one or more devices based, at least in part, on the respective locations. The respective roles are for at least generating the one or more media items.

According to another embodiment, a computer program product including one or more sequences of one or more instructions which, when executed by one or more processors, cause an apparatus to determine one or more devices for generating one or more media items of at least one subject. The apparatus is also caused to determine respective locations of the one or more devices relative to one or more focal areas of the at least one subject. The apparatus is further caused to determine respective roles for the one or more devices based, at least in part, on the respective locations. The respective roles are for generating the one or more media items.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 6A and 6B are diagrams of event maps and respective user equipment locations used in the processes described with respect to FIG. 5, according to various embodiments;

FIG. 7 is a flowchart of a process for generating a compilation of recordings of a subject based on audio cues, according to one embodiment;

FIGS. 8A-8E are diagrams of the processes for segmenting recordings for compilation, according to various embodiments;

FIGS. 11A-11C are map diagrams displaying example maps of locations utilized to generate context vector information, according to various embodiments;

DESCRIPTION OF SOME EMBODIMENTS

Examples of a method, apparatus, and computer program for generating a compilation of media items are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
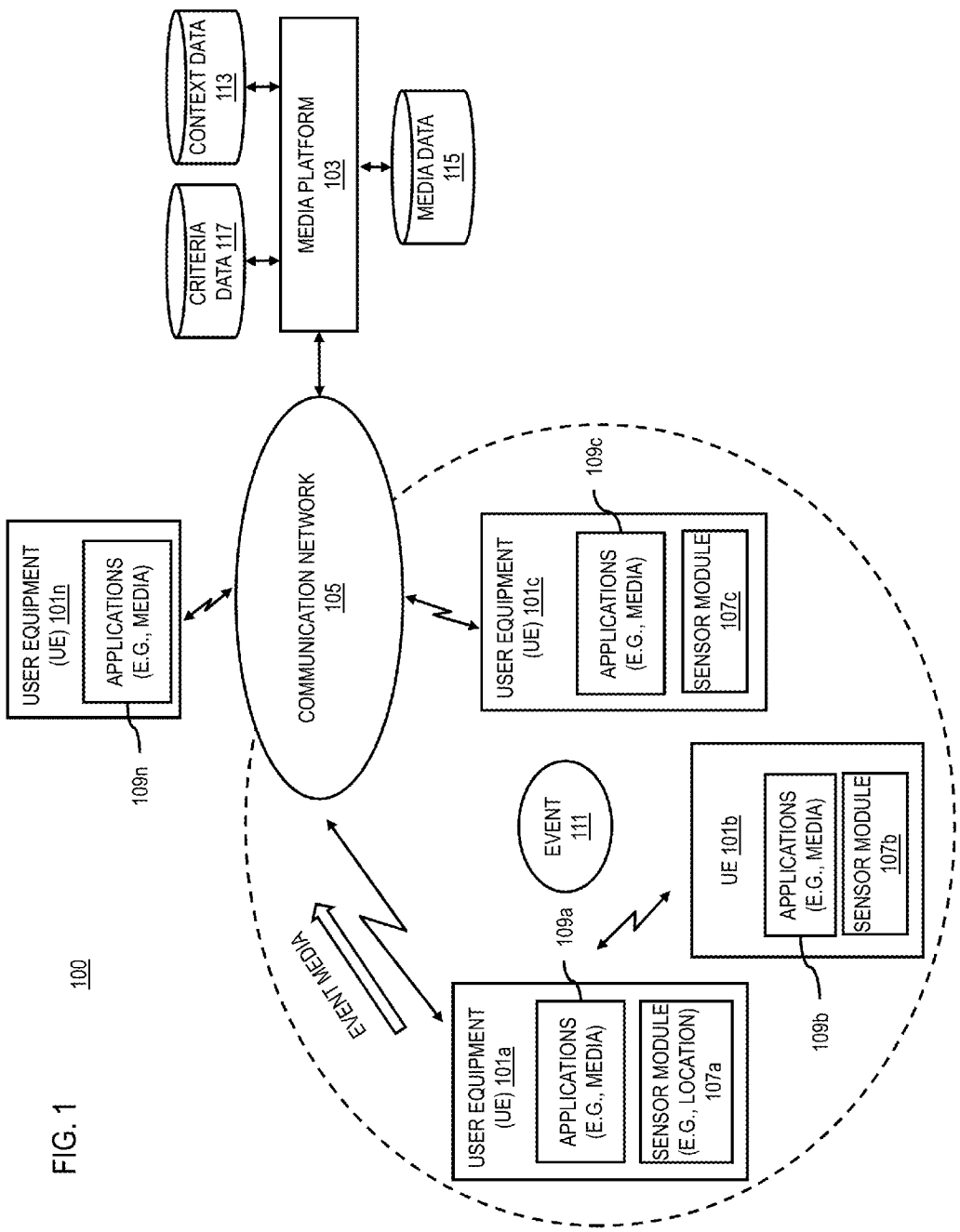
FIG. 1 is a diagram of a system capable of determining roles for media generation and compilation, according to one embodiment.

FIG. 1 is a diagram of a system capable of determining roles for media generation and compilation, according to one embodiment. Modern communication systems offering higher bandwidth Internet access (e.g., both wireless and wireline) has driven consumers to high levels of multimedia (particularly video) consumption. By way of example, it is common for users to generate one or more media items (e.g., take a photograph, record video, record audio, etc. of a certain subject (e.g., an event, a place, an object, a person, etc.) that they find interesting. An event can be, for example, a music concert, carnival, festival, sporting event, family gathering, and/or any other occasion of interest to the user. Similarly, a place can be a location of interest (e.g., a tourist attraction) that is not associated with specific ongoing event. On most occasions, there are typically multiple users who record or otherwise capture a particular subject (e.g., an event, a place, etc.) using their personal media generation or recording devices (e.g., mobile phones, cameras, camcorders, etc.). Various embodiments are described below with respect to a subject that is an event. However, it is contemplated that the approach described herein is applicable to any subject (e.g., a place, an object, a person, etc.) that can be captured in one or more media items by one or more devices.

Compiling the various recordings of the subject or event for the different devices has traditionally been a resource intensive process. For example, one traditional approach is a manual process that often relies on a human director. In this example, the human director usually has a directing studio or other facility with availability of multiple displays where each display corresponds to a camera and a cameraman. In the case of filming a subject or event using a multi-camera setup, there are usually at least the following cameras from which the human director can choose: a left side close-up camera, a right side close-up camera, and a center wide-angle camera. Each of these cameras, for instance, have a particular role with respect to the capturing an event. For example, as the name implies, the left side close-up camera has the role of capturing footage of a subject or area of interest within the event using a tight or close-up shot that focuses on the left side of the subject. By having multiple cameras or capturing devices, the director is more likely to capture scenes of interest that can be later composited or compiled. It is also contemplated that there can be any number of additional cameras to provide for an even more complex multi-device capturing or recording scenario. The human director having the different camera views under his or her control can then decide when to switch among the various cameras to best capture the event. In this scenario, it is apparent that the logic and intelligence for making the switch rests with the human director.

However, in multi-device recording or media generation approaches that rely on automated or non-human processes, technical challenges arise in how to enable an automated approach to simulate a similar level of intelligence and/or understanding of the content (e.g., videos) recorded by each of the individual devices and then combining that individual recordings into a compilation that contains relevant, interesting, and/or important parts of the captured event. More specifically, the main problem is represented by the decision process for understanding which view (e.g., which part of a recording to use and/or which recording from which device to use) to use in a particular time slot of a compilation, in order to make the association between image sequence and audio track meaningful to end-users from a semantic point of view. In addition, another problem concerns determining the timing and the modalities (e.g., transitions) for switching from one content segment (e.g., image sequence or video) to another so that the compilation is meaningful and/or maintains a continuity with respect to the audio and/or video portions of the content.

In the case where the compilation attempts to relate or match the recordings or media items of one subject or event to the recordings or media items of other similar subjects, the problems can increase. For example, in a case where the same musical piece was performed in more than one event (e.g., by the same or different musical band), and a compilation (e.g., a "Director's cut" of the events) is to be prepared using the source recordings or media items from the events, an automated editing system faces the additional problem of how to select source content or segments of the content that are coherent in terms of, for instance, tempo. In fact, it is very likely that the piece was played using (at least) slight different tempos (e.g., as measured in beats per minute (BPM)) and even different time signatures by the different bands/performers at the events. Thus, switching (e.g., both video and audio switching) from one recording to another would not be straightforward and could result in a compilation that is uncomfortable or unpleasant to view.

To address these problems, a system 100 of FIG. 1 introduces the capability for an automated media compilation platform to determine and/or assign specific roles (e.g., camera position, close-up shots, wide angle shots, mobile, stationary, etc.) to one or more devices (e.g., user equipment (UEs) 101a-101n) that are participating in a multi-device media capture or recording of a subject (e.g., an event, a place, an object, etc.). In this way, the system 100 can infer or otherwise determine the type of content (e.g., type of view captured in the content) based on the assigned role of the capturing device, thereby avoiding the need to perform potentially resource intensive parsing of, for instance, a video portion of the content to determine similar information. The system 100 can then use automated processes to generate a compilation of the media items (e.g., recordings) of the subject by selecting segments of the media items to include based, at least in part, on the roles of the capturing devices.

In one embodiment, the system 100 determines a participating group of UEs 101a-101n (also collectively referred to as UEs 101) and identifies their relative locations with respect to one or more focal areas of the subject or event. By way of example, the focal areas may correspond to at least approximate and/or anticipated locations of performers, other participants, regions of interest (e.g., props, displays, attractions, scoreboards, and the like) in the events, corresponding places, etc. Based, at least in part, on the respective locations of the participating UEs 101, the system 100 can determine and/or suggest respective roles for the UEs 101. In some embodiments, the system 100 may signal potential or recommended roles to one or more of the UEs 101 for selection and/or confirmation. In some cases, one or more of the UEs 101 or the corresponding users may determine the roles for all participating devices. In addition or alternatively, each UE 101 may determine or select its own role. In yet another embodiment, the system 100 determines or assigns the roles without input from the UE 101 and/or the respective users.

In another embodiment, the system 100 can generate and present a map representing the subject (e.g., event, place, etc.), one or more focal areas of the subject, other participating UEs 101, or a combination thereof. Based, on the map, the individual UEs 101 and/or corresponding users may select the one or more roles. In one embodiment, the system 100 determines a map of the subject area based on user input (e.g., specifying a location, a place, an event type, event venue, etc.). In another embodiment, the system 100 can determine context information associated with the subject (e.g., location, time, date, etc.) and then conduct a search for matching information (e.g., matching scheduled events). The results of the search may then be used to generate and/or propose a subject or event map and/or corresponding focal areas. For example, if the system 100 determines that a particular subject is a concert event by a four-member band, the system 100 may determine an event map to include at least one focal area corresponding to the anticipated location of each of the members of the band.

In another embodiment, the system 100 may suggest and/or assign roles based on assignments stored with respect to other similar stored subjects or events. For example, the system 100 may use context information about an event to identify that a particular event is another stop of a national concert tour by a particular band. The system 100 determines whether previous role assignments have been stored for other stops on the concert tour. If such information is available, the system 100 may determine the roles based, at least in part, on the retrieved information.

In another embodiment, the system 100 may determine or update the roles of the participating UEs 101 before and/or during the event or the generating of the one or more media items. For example, if the participating UEs 101 have scheduled with the system 100 to attend a particular event before the event occurs, then the system 100 can retrieve related event information and pre-determine one or more of the roles and/or recommendations for one or of the roles. These roles can then be signaled to the respective devices. In some cases, if the users of the participating UEs 101 know their seat assignments or otherwise have knowledge regarding their anticipated location, this information can also be signaled to the system 100 for determining the respective roles before the event.

In another embodiment, the system 100 can direct one or more of the devices to sample a portion of the content (e.g., ambient music or sounds) associated with the subject or event. The system 100 can then attempt to recognize the content or sounds to identify information about the subject (e.g., type of event, content performed at the event, etc.) to facilitate determining and assigning roles to the UEs 101. For example, if the system 100 detects that the subject is a concert event and recognizes that the band is performing a particular song (e.g., based on sampling and identifying the song), the system 100 can anticipate particular segments of the performance (e.g., guitar solos, choruses, verses, etc.) and direct the UEs 101 accordingly (e.g., signaling a UE 101 to zoom or move to a particular location in anticipation of a particular segment of the event).

In some embodiments, as the event is occurring or as media items of a subject are captured, the system 100 can continue to monitor the locations and/or context information (e.g., location, orientation, recording quality, remaining recording capacity, participating UEs 101 leaving or joining the multi-device recording, etc.) associated with the participating UEs 101, the subject, the event, content performed at the event, and the like. Based on the monitoring, the system 100 can reassign or re-determine one or more of the roles. For example, if one device runs out of recording space or can no longer capture content according to is assigned role, the system 100 may reassign another device to take over to role to ensure that the event can be fully covered.

In one embodiment, the system 100 can generate identifiers associated with the roles (e.g., a code or name) and then tag the respective recordings with the role identifiers (e.g., as metadata) to facilitate subsequent correlation of the recordings with the corresponding roles. By way of example, the role identifiers can be stored in a table along with identifiers of the respective UEs 101 to identify the role assignments. The table can then be transmitted or signaled to one or more of the participating UEs 101.

After completing generating the media items of a subject (e.g., after recording the event), the system 100 can determine to generate a compilation of the media items and/or one or more segments of the media items based, at least in part, on the assigned roles of the UEs 101 making the recordings. As noted above, the system 100 can use the assigned roles of the recording UEs 101 as an indicator of the content present in the respective media itmes and then manipulate the media items and/or segments to generate a meaningful compilation of the subject or event without have to expend resources parsing or otherwise attempting to process the media items to understand the media items and their semantic relationships (e.g., a close up of the same scene, etc.) to other media items of the subject or event. In one embodiment, the roles can be defined with respect to the recording UE 101 (e.g., a UE 101 that has been assigned to capture wide shots), with respect to the roles of the focal areas (e.g., a focal area based on the role of a performer such as a vocalist, a drummer, etc.), or a combination thereof.

In another embodiment, the system 100 can generate the compilation based on the determined roles in combination with audio cues associated with or extracted from the media items. In other words, the system 100 can determine how to segment and combine the various media items into a coherent compilation. By relying on audio cues (e.g., in the audio track of a video), the system 100 can process just the audio portion of the media items as opposed to both the audio and video portions to generate a compilation. In this way, the system 100 advantageously reduces the resource burden (e.g., computing resources, memory resources, bandwidth resources, etc.) associated with processing the video portion.

In another embodiment, the system 100 can analyze the audio cues or other audio information extracted from the media items to determine, for instance, tempo information (e.g., BPM), mood information (e.g., melancholy, happy, etc.), audio structure information (e.g., the component parts of a musical track such as an introduction, verse, bridge, chorus, solo, etc.). This information is then used to generate the compilation. In certain embodiments, the system 100 can sample the audio cues or extracted audio tracks of the media items and then identify content in the samples (e.g., using music identification algorithms or services). Based on this recognition or identification of the content, the system 100 can, for instance, retrieve additional metadata or even a reference copy (e.g., a studio track version of a live performance, a concurrent professional recording of an event, etc.) which may provide higher quality files for determining the tempo, mood, or structure of the recordings of the event. By way of example, the reference copy of a recognized audio track may be used as a template for determining the tempo, mood, and/or structure of the audio cues that can be adjusted by one or more characteristics of the actual performance in the recording (e.g., to account for differences in tempo, pitch, instrumentation, timing, etc.).

In some embodiments, the respective roles, determined tempo, mood, and/or structure may be used individually or in combination to determine how to segment the recordings including determining how many segments, the durations or the segments, transitions between the segments, edit points between the segments, or a combination thereof. For example, if the mood of a song is melancholic, then the system 100 may reduce the number of segments, increase their durations, lengthen the transitions, use cross-fade as transition type as opposed to a hard-cut, etc. In another example, the system 100 may use the tempo information to determine where to place edit points. For instance, the system 100 can determine the BPM of each segment (and the temporal position of each beat) and then recombine them on the beat to ensure a less abrupt transition between each segment.

In addition, although various embodiments are discussed herein with respect to recording and compiling media items of a single common subject or event, it is contemplated that recording from one or more subjects or events may be included in the compilation based on, for instance, the roles of the recording devices and the determined audio cues and related information. For example, multiple performances of the same song performed at different events (e.g., different concerts) may be compiled using the approach described herein.

As shown in FIG. 1, the system 100 comprises one or more mobile devices (e.g., UEs 101*a*-101*c*) than can be utilized to capture or record media items at an event. In one embodiment, the UEs 101*a*-101*c* cooperatively capture media items (e.g., photos, video clips, audio clips, etc.) of an event or subject according to one or more roles determined by the media platform 103. The media items/recordings and related information (e.g., context vectors, role identification, etc.) are then transmitted to the media platform 103 via a communication network 105. The media items can be captured, for instance, to explicitly transmit information about an event or may be captured for other purposes (e.g., sightseeing, general interest, etc.) but then co-opted for use in the approach described herein. The media may be analyzed to determine information about an event and the roles for recording the event among multiple devices which can be transmitted to the UEs 101*a*-101*c*. Further, media items can be combined to generate the compilation based on one or more criteria (e.g., the roles of the capturing devices, context information about the devices, event information, etc.) and a plurality of media items or recordings. The compilation can thus be a customized director's cut combining various media items for a user based on, for instance, the roles determined for the recording devices and audio cues determined from the recordings.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). The UE 101 may include a sensor module 107*a*-107*c* to determine context vectors (e.g., location information, timing information, device information, context information from captured content, etc.) of the UE 101. The sensor module 107 may be utilized by one or more applications 109 (e.g., media applications 109*a-n*, event applications, etc.). The system 100 has been simplified for to include three UEs 101*a*-101*c* to capture the event, however, it is contemplated that any multiple number of UEs 101 (e.g., more than two UEs 101) can be utilized in capturing information about the event.

The UEs 101*a*-101*c* may utilize respective media applications 109 to capture media of an event 111 as well as the location, via a location sensor of the sensor module 107, and other information (e.g., compass information, accelerometer tilt information, etc.) about the UE 101 during the event. In certain embodiments, the event may include a static event (e.g., a normal occurrence such as media capture around a monument), a sudden incident (e.g., a spontaneous occurrence such as an accident or an impromptu folk festival that users determine is a good reason to capture media), a special event (e.g., an occurrence that is indicated to be more important by the media platform 103 based on certain criteria), a combination thereof, or the like.

When the media is captured, a context vector can be determined and associated with the media. In addition, the context vectors may be determined before the capture of the media so that the media platform 103 may determine, assign, and/or suggest possible roles to the UEs 101 for capturing an event. As discussed previously, coordination of roles among the UEs 101 enable to the system 100 (e.g., the media platform 103) to maximize coverage of an event, as well as to identify the recordings with the respective roles to facilitate compilation of the recordings. In certain embodiments, a context vector is one or more data items that can be associated with the media. As such, a context vector can include time information, a position (Pi) of the UE 101, an altitude (Ai) of the UE 101, a tilt (Ti) of the UE 101, an orientation (Oi) of the UE 101, a zoom level (Zi) of the UE 101, a focal length (Fi) of the UE 101, a field of view (FOVi) of the UE 101, a radius of interest (RadiusOIi) of the UE 101 while capturing the media content, a range of interest (RangeOIi) of the UE 101 while capturing the media content, or a combination thereof. The position can be detected from one or more sensors of the UE 101 (e.g., via a Global Positioning System (GPS)). Further, the altitude can be detected from one or more sensors such as an altimeter and/or GPS. The tilt of the UE 101 can be based on a reference point (e.g., a camera sensor location) with respect to the ground based on accelerometer information. Moreover, the orientation can be based on compass (e.g., magnetometer) information and may be based on a reference to north. One or more zoom levels, a focal length, and a field of view can be determined according to a camera sensor. In one embodiment, these capabilities may be signaled to the media platform 103 for use in determine role assignments or suggestions. In some embodiments, the UE 101 may also report additional context information such as device status information including, for instance, remaining memory for storing recordings, remaining battery life, and the like. Further, the radius of interest and/or range of interest can be determined based on one or more of the other parameters or another sensor (e.g., a range detection sensor). This range of interest can also be used to determine what role should be assigned or suggested to a particular UE 101.

In certain embodiments, capture of a media item can include corresponding context vector information. For example one or more frames of a video can have associated with it an audio component as well as a context vector. Thus the context vector can be associated with one or more segments of the media item. Further, the context vector can be stored in one or more data structures or forms, such as RDF/XML (Resource Description Framework/Extensible Markup Language). As noted above, the context vector may include location information, orientation information, mobility information (e.g., whether a UE 101 can move during an event), information on device capabilities (e.g., a zoom level, remaining recording time, etc.).

Further, the media platform 103 can automatically determine or infer information about the occurrence of an event or other event related information (e.g., focal areas within the event) by evaluating one or more of the context vectors received from one or more UEs 101a-101c during an event. In one embodiment, the context vectors may be used to construct a map of the event, the focal areas, locations of participating UEs 101, and the like. By way of example, a context vector can be transmitted as a data structure of information (e.g., independent of media content and/or with the media content). By way of example, the context vector may be utilized to determine one or more focal points of a plurality of UEs 101 by using the location and orientation of each of multiple UEs 101 (e.g., the intersection of the orientation or views of the UEs 101). This focus may be determined to be a center or other important point of the event. In one scenario, the context vector is separated from the media to conserve bandwidth when transmitting the context vector to the media platform 103. Under this scenario, the context vectors may be transmitted in real time or near real time while the actual media is streamed or transmitted at a later time. With this approach, guidance can be provided to other users capturing the event 111 including guidance with respect to assign roles and related tasks or responsibilities. Moreover, a media application 109 may include options as to participate or not participate in a service provided by the media platform 103 for multi-device recording and compilation of an event. In certain embodiments, to encourage participation, the user may be recognized or compensated if the user's media is presented to other users or compiled into a Director's cut.

The media platform 103 may receive the context vectors and the media from UEs 101 and store the information in one or more databases. The context vectors can be stored in a context data database 113. The context data database 113 may be utilized to store current and historical data about events. Moreover, the media platform 103 may have access to additional historical data (e.g., historical role assignments, historical sensor data or additional historical information about a region that may or may not be associated with events) to determine the type of event that is or will occur and to determine corresponding roles for recording the event. A media data database 115 can be utilized for collecting and storing media items including recordings, role assignments, recognized content, event information, templates for generating compilations, etc. In one embodiment, the media items may include metadata including associated content vectors.

The events or historical data may be sorted using the geo-location of the UEs 101 or a determined geo-location of events. Further, the media may be published from the media data database 115 to one or more UEs (e.g., UE 101n). The media platform 103 may additionally extract an identifier associated with a particular UE 101 from a received context vector and associate the user and/or UE 101 with a profile. The user profile may be utilized to collect historical event information about a particular UE 101 or user. This data may be used in determining how often media or recordings associated with the user are included in a compilations generated by the media platform 103.

The media platform 103 can utilize criteria (e.g., role assignments, audio cues, tempo information, mood information, audio structure information) from a criteria data database 117 to generate one or more compilations. As previously noted, the compilations can represent a director's cut of media items associated with an event 111.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

By way of example, the UEs 101 and media platform(s) 103, communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the UE 101 and media platform 103 interact according to a client-server model. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
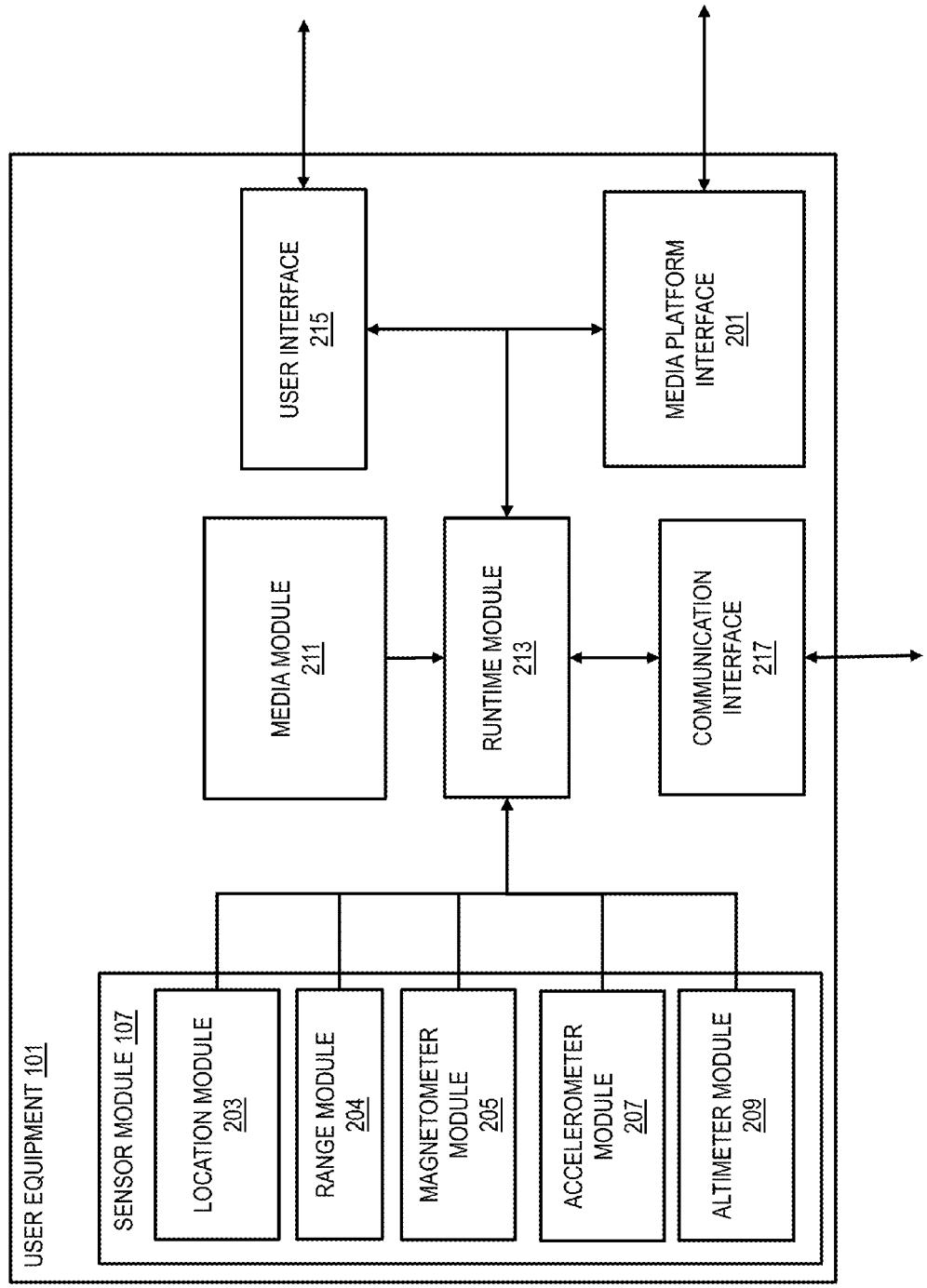
FIG. 2 is a diagram of the components of a user equipment that can be utilized in determining roles for media generation and compilation, according to one embodiment.

FIG. 2 is a diagram of the components of a user equipment that can be utilized in determining roles for media generation and compilation, according to one embodiment. By way of example, the UE 101 includes one or more components for interacting with the media platform 103 to determine one or more roles with respect to multi-device recording or capturing media items (e.g., images, video, audio) of a subject or event. The UE 101 also includes one or more components for collecting and transmitting media items and context vectors. It is contemplated that the functions of these components may be combined in one or more components or performed by other components of equivalent functionality. In this embodiment, the UE 101 includes a media platform interface 201 to communicate with the media platform 103, a sensor module 107 that includes a location module 203 to determine the location of a UE 101, a range module 204 to detect the range of an object from the UE 101 while capturing media, a magnetometer module 205 to determine horizontal orientation of the UE 101, an accelerometer module 207 to determine vertical orientation of the UE 101, an altimeter module 209 to determine altitude, a camera module 210 to capture images, and other sensor modules (not shown), a media module 211 that may be used to capture media, a runtime module 213 to execute applications on the UE 101, a user interface 215, and a communication interface 217. Information from the location module 203, range module 204, magnetometer module 205, accelerometer module 207, and media module 211 may be used to determine the direction or vector along which the UE 101 is aligned when, for instance, capturing event related media or information (e.g., the direction or vector along which a camera of the UE 101 is pointed when capturing an image of an event).

In this way, the UE 101 may generate and transmit a context vector to media platform 103 that includes at least the directional and location information. In one embodiment, the context vector may also include information on device capabilities (e.g., camera capabilities) and status (e.g., remaining memory, battery life, recording time, etc.). The context vector can then be used by the media platform 103 to determine a relative location of the UE 101 with respect to one or more focal areas of an event. As described above, the media platform 103 then determines or suggests one or more roles for the UE 101 for participating in a multi-device recording of the event based, at least in part, location information and other context information in the context vector.

The media platform interface 201 is used by the runtime module 213 to communicate with a media platform 103. In some embodiments, the interface is used to signal role information between the UE 101 and the media platform 103 as described previously. The media platform interface 201 may also be used to upload media and context vectors for processing at the media platform 103. Further, the media platform interface 201 may be utilized by an application 109 to receive event information including event maps, event focal areas, other participating UEs 101, etc. from the media platform 103. In certain embodiments, the event information includes a determination that an event 111 is occurring, an extent of the event 111, a face of the event 111, a structure of the event 111, a type of the event 111, content associated with the event 111, or a combination thereof. In certain embodiments, the face of the event 111 is the direction of a focus point of the event 111 points towards (e.g., a front stage at a concert). As such, the face of the event 111 may be the outward presentation of the event that the UEs 101 capture media regarding the event from. The location module 203, magnetometer module 205, accelerometer module 207, and media module 211 may be utilized to create context vectors to transmit to the media platform 103.

Moreover, in certain embodiments, UEs 101 may additionally communicate with other UEs 101 and devices via the communication interface 217. In these scenarios, information may be transmitted between UEs 101 via a peer-to-peer network topology. The UE 101 may communicate with other UEs 101 utilizing an application 109 based on proximity to the other UEs 101 with respect to, for instance, coordinating the multi-device recording of the event 111. In another embodiment, a first UE 101b may utilize a second UE 101a as a conduit to communicate with the media platform 103. In this scenario, the second UE 101a may collect information (e.g., context vectors, responses to role signaling, and/or media) from the first UE 101b and upload the information to the media platform 103. This may be useful when there is a crowd of UEs 101 (which may regularly occur during an event) and the network is a bottleneck or congested because of the crowd.

In one embodiment, the location module 203 can determine a user's location. The user's location can be determined by a triangulation system such as a GPS, assisted GPS (A-GPS) A-GPS, Cell of Origin, wireless local area network triangulation, or other location extrapolation technologies. Standard GPS and A-GPS systems can use satellites to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 203 may also utilize multiple technologies to detect the location of the UE 101. GPS coordinates can provide finer detail as to the location of the UE 101. The location module 203 may be utilized by the application 109 to capture location information as part of a context vector to transmit to the media platform 103.

The range module 204 can include one or more sensors that sense the range of an object. For example, an infrared sensor, a radio sensor, a sonic sensor, a laser, a lidar, a radar, etc. can be utilized to determine a range between the UE 101 and an object. The range detection can further be guided to determine how far an object centered by the UE 101 is. The range module 204 can thus detect what is in view and whether the view includes one or more obstructions to an event 111. Range detection is further detailed in FIG. 7B.

The magnetometer module 205 can include an instrument that can measure the strength and/or direction of a magnetic field. Using the same approach as a compass, the magnetometer is capable of determining the direction of a UE 101 using the magnetic field of the Earth. The front of a media capture device (e.g., a camera module 210) can be marked as a reference point in determining direction. Thus, if the magnetic field points north compared to the reference point, the angle the UE 101 reference point is from the magnetic field is known. Simple calculations can be made to determine the direction of the UE 101. In one embodiment, horizontal directional data obtained from a magnetometer is stored in a context vector when media is captured. This directional information may be correlated with the location information of the UE 101 and other UEs 101 to determine a focus point (e.g., where multiple vectors associated with the determined locations cross paths) for the event 111.

Further, the accelerometer module 207 may include an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 207 can determine the angle the UE 101 is pointed as compared to Earth's gravity. In one embodiment, vertical directional data obtained from an accelerometer is stored in the context vector when media is captured.

Moreover, the altimeter module 209 may be utilized to determine the altitude of the UE 101 during the event. Altitude information may be included in the event vector to determine a vantage of the user while capturing media. Moreover, altitude information may be used to determine events happening at a single longitude and latitude location, but at a different elevation (e.g., on a roof of a building, edge of a cliff, etc.). In certain embodiments, the altimeter module 209 includes a pressure altimeter that determines barometric pressure to determine the altitude. In another embodiment, the UE 101 may include a temperature sensor that is used to infer altitude based on the ambient temperature (e.g., temperature decreases at known rate with increasing altitude). In addition or alternatively, GPS information may be utilized to determine altitude information.

Media can be captured using a media capture device associated with the media module 211. A media capture device may include a camera module 210, an audio recorder, a video camera, a combination thereof, etc. In one embodiment, visual media is captured in the form of an image or a series of images. In one embodiment, the images or series of images may be captured as stereoscopic of three-dimensional images. The media module 211 can obtain the image from a camera and embed the image within an event vector also containing location data, timing data, and orientation data. Moreover, the event vector may additionally include air-pressure sensor data, temperature sensor data, other such sensor data, or a combination thereof. Timing information can be synchronized between UEs 101 utilizing one or more services. In certain embodiments, the UEs 101 include a cellular radio. The cellular radio can be utilized to synchronize the UE 101 to a particular time associated with a wireless carrier. Carrier information can be included as metadata because different carriers can include different timing clocks. As such, the timing information can be synchronized based on carrier. Additionally, one or more offsets can be determined between UEs 101 associated with different carriers. Further, content processing (e.g., audio processing) may be utilized to synchronize timing of associated media items.

Information that is collected to transmit to the media platform 103 may be controlled and viewed using the user interface 215, which can include various methods of communication. For example, the user interface 215 can have outputs including a visual component (e.g., a screen), an audio component (e.g., a verbal instructions), a physical component (e.g., vibrations), and other methods of communication. User inputs can include a touch-screen interface, microphone, camera, a scroll-and-click interface, a button interface, etc. Further, the user may input a request to start an application 109 and utilize the user interface 215 while capturing media. Additionally or alternatively, the UE 101 may include an application 109 that can be presented using the user interface 215. Utilizing the user interface 215, the user may select to view one or more views of the event 111 and/or request that events nearby the user be presented to the user. Further, the user may, while capturing media items, receive output describing where to focus and/or other guidance information.

Additionally, the user interface 215 can be utilized to present suggested roles, tasks or functions related to the roles, and/or compilations of media items among other items. For example, the runtime module 213 can request the compilation from the media platform via the media platform interface 201. The runtime module 213 can then receive the compilation (e.g., via download or a stream) and present the content via the user interface 215. In certain embodiments, the user can enter parameters for determining criteria (e.g., role information, audio cues, etc.) to control the user experience of the compilation via the user interface 215. These criteria and/or parameters for determining the criteria can be sent to the media platform 103. The media platform 103 can process the compilation according to the criteria and send the compilation. The runtime module 213 can then receive the compilation and present it via the user interface 215. The compilation can be made dynamically according to one or more interactive responses.

Figure 3:
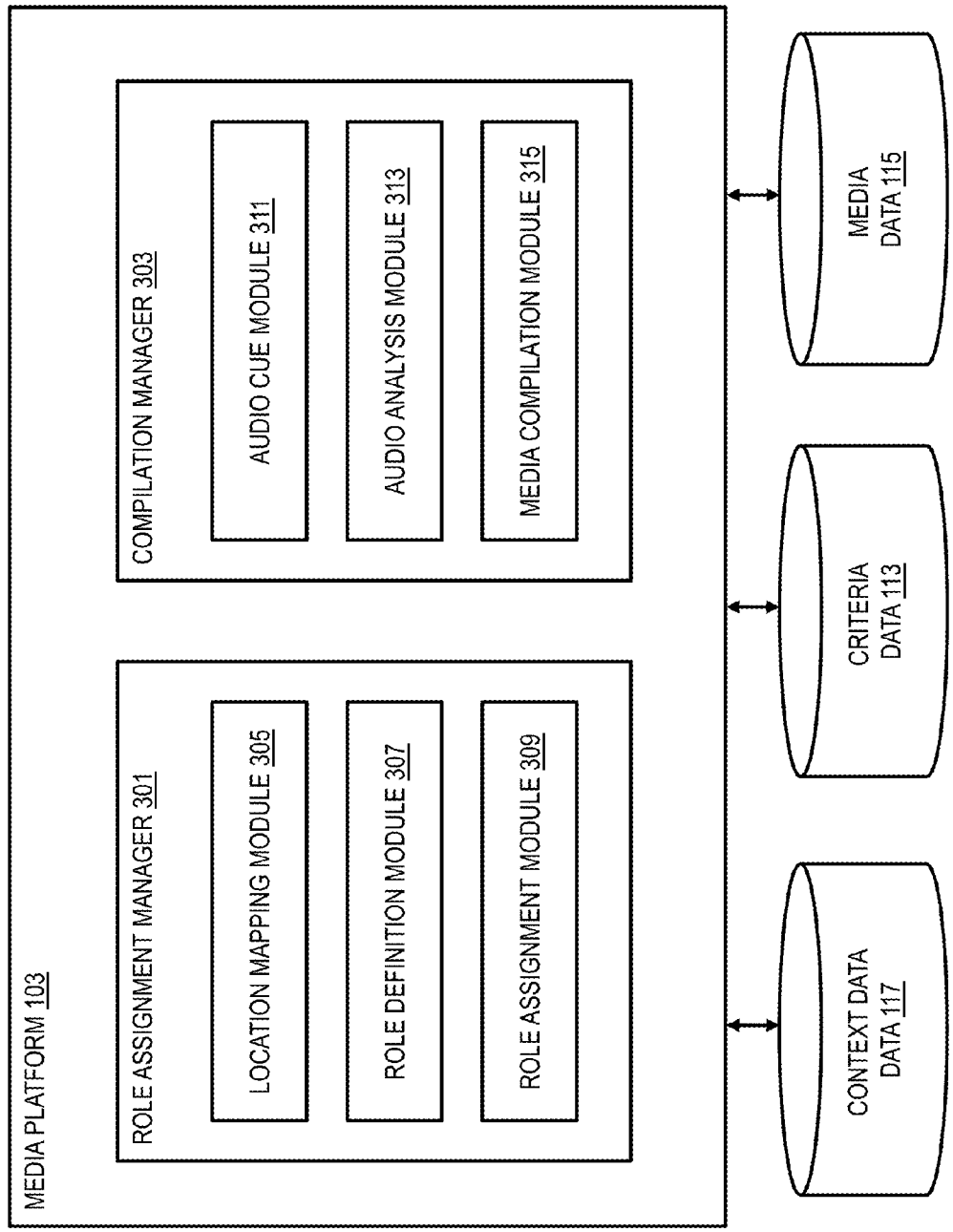
FIG. 3 is a diagram of the components of a media platform that can be utilized in determining roles for media generation and compilation, according to one embodiment.

FIG. 3 is a diagram of the components of a media platform that can be utilized in determining roles for media generation and compilation, according to one embodiment. By way of example, the media platform 103 includes one or more components for determining roles for media generation and compilation (e.g., multi-device media generation and compilation). It is contemplated that the functions of these components may be combined in one or more components or performed by other components of equivalent functionality. In one embodiment, the media platform 103 includes a role assignment manager 301 and a compilation manager 303. More specifically, the role assignment manager 301 includes a location mapping module 305, a role definition module 307, and a role assignment module 309 for determining one or more roles for UEs 101 participating in a multi-device recording of an event.

The location mapping module 305 determines, for instance, the locations and/or relative locations of the participating UEs 101 within a geographical area of the location hosting the event 111 or related to a subject of interest. In one embodiment, the location mapping module 305 uses any available method for generation a map of the participating UEs 101. For example, the location of the UEs 101 can be received at the location mapping module 305 as one or more context vectors.

In addition to the user map, the location mapping module 305 also generates a map of the event area or subject area (e.g., map of the event venue) that identifies the focal areas (e.g., relative position of performers for performance events). This map can be generated based on user input or derived from the context vectors of the participating UEs 101. In the case of user input, the location mapping module 305 can use pre-existing templates that represent common venues (e.g., performance stage, sport stadium, concert hall, etc.) as possible suggested event maps. In some cases, these templates can also be made for an easy, quick, and fun way (e.g., using representative graphics or other flourishes) for the user to enter the event map.

The role definition module 307 can then use the maps of the UEs 101 and of the subject area to define possible roles for the recording the subject. For example, depending on the locations of the focal areas within the maps, the role definition module 307 can specify a number of possible roles (e.g., a close up of the primary focal area, two alternate angles of the primary focal area, long shots of the audience for audience reaction, and one role for other focal areas, etc.). With respect to recording an event, the roles may also be defined based on, for instance, the shape of the event stage or venue, the number of performers in the event, their spatial arrangement, seating arrangements of the audience, etc.). In this way, the defined roles can be customized to fit different types of events, event venues, and different user preferences for making compilations.

Based on the defined roles and the location maps, the role assignment module 309 can then suggest or directly assign one or more of the participating UEs 101 to fill the roles. For example, the role assignment module 309 assign UEs 101 that are found to be close to the event stage or subject to roles tasked with recording close-ups. UEs 101 found to be in the center of the event venue or subject area but away from the event stage or other focal areas can be assigned to roles tasked with recording wide-angle shots.

With respect to the compilation manager 303 of the media platform 103, in one embodiment, the compilation manager 303 includes an audio cue module 311, an audio analysis module 313, and a media compilation module 315. In this example, the audio cue module 311 extracts one or more audio portions of the media items (e.g., recordings) made by one or more of the participating UEs 101. In this way, the compilation manager 303 advantageously reduces the resource burden associated with segmenting the one or more media items for compilation by avoiding or minimizing the need to process the video portion of the media items.

Once the audio cues and/or tracks are extracted from the media items, the audio analysis module 313 processes the audio cues or tracks to assist in determining one or more segments of the media items, one or more durations of the segments, one or more transitions between segments, one or more edit points between the segments, or a combination thereof. By way of example, the audio analysis module 313 makes this determination by, for instance, analyzing audio characteristics of the audio cues or tracks to determine tempo information (e.g., BPM, changes in tempo, consistency of tempo, beat temporal position, etc.), mood information (e.g., based on pitch, key, note progression, etc.), and audio structure information (e.g., identifying distinct portions of the audio including an introduction, verse, solo, etc.).

In one embodiment, the audio analysis module 313 may perform content recognition on at least a portion of the audio cues. Based on the recognition, the audio analysis module 313 can obtain a reference copy of any recognized content (e.g., a recognized song). In this case, the reference copy may be a published version of the content (e.g., a studio version of a song). The audio analysis can then be performed on the reference copy before or in lieu of analysis of the recordings.

Following audio analysis, the media compilation module 315 determines one or more segments of the recordings and one or more resulting compilations of the segments. By way of example, the media compilation module 315 can use any of the following approaches to switching between segments within the compilation (e.g., how to decide which recording segment to use in a particular time slot of the compilation): (1) role-based switching, (2) tempo (e.g., beat) based switching, (3) mood-based switching, (4) music structure-based switching, or a combination of any of the four approaches.

In one embodiment, role-based switching is based on the participating UEs 101 having been assigned a role for capturing a subject or event. The assignment, for instance, is determined by the role assignment manager 301 or by the UE 101 itself in a multi-device recording scenario. For example, in the context of a concert event, one UE 101 may have had the role of focusing on a guitar player in the first focal area, another UE 101 on the singer, another UE 101 on the whole band, and another UE 101 on the audience. After the information about the roles of each UE 101 has been provided, the media compilation module 315 is able to use such information for deciding which recording to switch to at a particular time instant based on, for instance, the analysis of the audio cues.

In another embodiment, tempo-based switching is based on, for instance, applying a beat tracking algorithm for extracting the beat sequence of a recording of the event. The obtained beat sequence is then used as reference for the timing of switching among different segments in the compilation.

In another embodiment, mood-based switching can be used to determine a modality for switching from one segment to another to provide the most audio coherence (e.g., from a semantic point of view) based on a mood detection algorithm. For example, based on the determined mood information, the media compilation module 315 will decide which type of transition to apply when switching among different segments and whether to switch to a different view at each beat extracted by the beat tracking system or only after a certain number of beats.

In another embodiment, music structure-based switching attempts to overcome the problem of switching (e.g., both video and audio) from performance event to another (e.g., of the same musical piece) that could have different tempos and time signatures. For example, the media compilation module 315 uses an algorithm that performs automatic music structure analysis, and based on the obtained structure, the media compilation module 315 then decides which timestamps will be used from one musical performance to another in order to minimize the negative effects (e.g., from an end-user experience point of view) of switching between two different tempos and possibly also time signatures.

Figure 4:
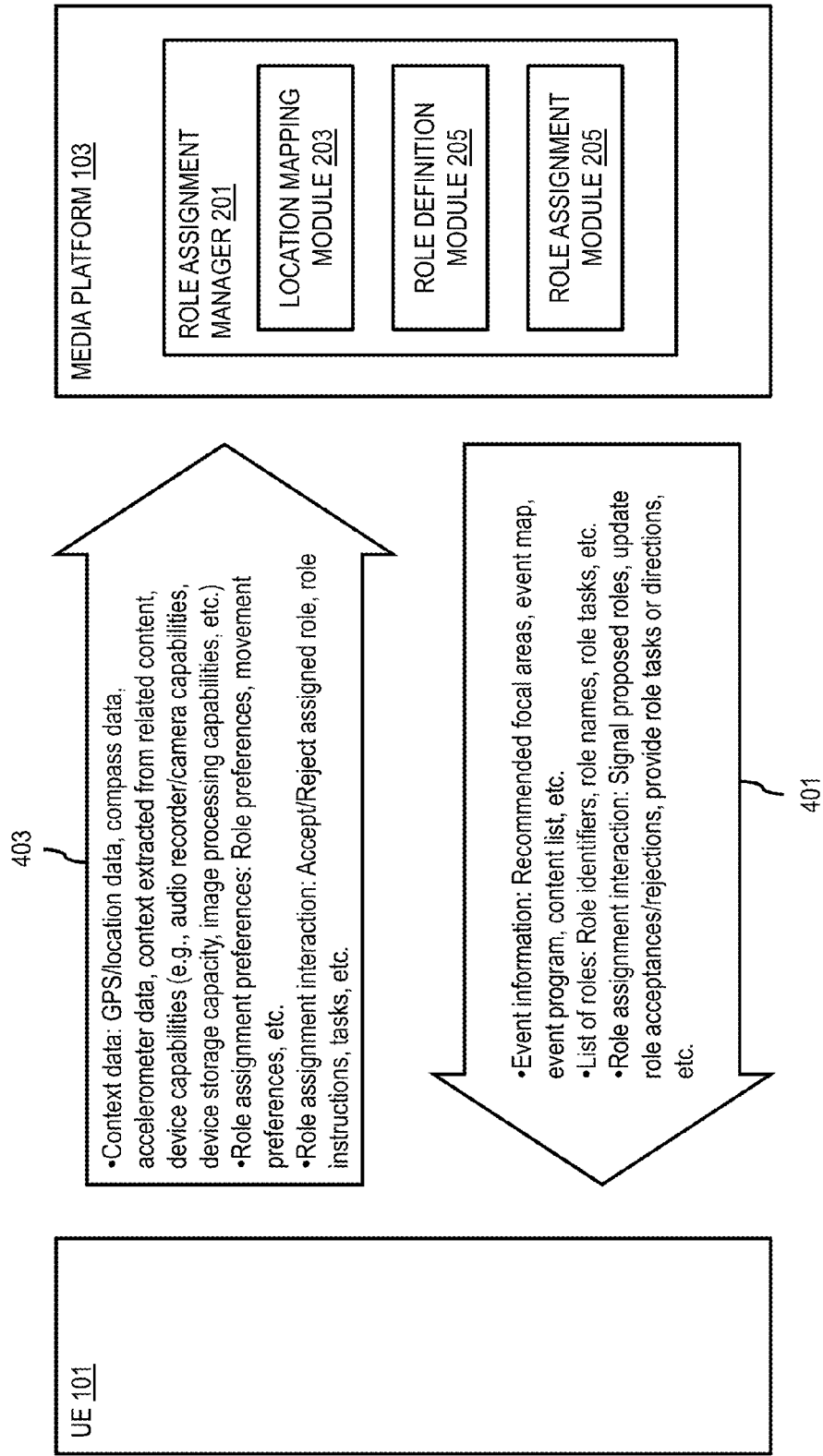
FIG. 4 is a diagram of signaling between a user equipment and a media platform for determining roles for media generation and compilation, according to one embodiment.

FIG. 4 is a diagram of signaling between a user equipment and a media platform for determining roles for media generation and compilation, according to one embodiment. During the course of an event, the media platform 103 and/or another platform can be utilized to provide role assignments and/or related guidance to UEs 101 for multi-device recording or capturing of a subject or event. As such, the UEs 101 can be associated with a service and/or application for collaboratively capturing the subject. Thus, signaling can be utilized in informing UEs 101 of determined roles and related information. Signaling can occur before generating or capturing media items of a subject or in real-time during the generating of the media items. As such, the media platform 103 can collect and store context vectors 601 associated with the subject or event of interest. Further, the media platform 103 can analyze the context vectors to determine respective locations of the participating UEs 101 with respect to one or more focal areas of an event 111 or subject.

For example, as shown, the media platform 103 can transmit one or more signals 401 to convey event information, list of roles, role assignment interactions, or a combination thereof the UE 101. By way of example, subject or event information may include user maps, event maps including recommended focal areas, event program information, a list of content associated with or performed during the event or otherwise associated with the subject. The list of roles may include role identifiers (e.g., to mark or designate recordings according to a role), role names, role tasks (e.g., what recording functions or subjects the role is responsible for), or a combination thereof. The role assignment interaction information includes signaling proposed roles, provide updates on role acceptances/rejections for the UEs 101, provide role tasks and/or directions, etc.

Similarly, the UE 101 can transmit one or signals 403 to the media platform for conveying context data or vectors, role assignment preferences, role assignment interactions, or a combination thereof. By way of example, the context data or vectors include GPS/location data, compass data, accelerometer data, context extracted from related content (e.g., detecting ambient sounds from live captures of the recording for audio location, etc.), devices capabilities (e.g., audio recorder/camera capabilities, device storage capability, image processing capabilities, remaining recording time or capacity, etc.), or a combination thereof. The role assignment preferences indicate preferred role settings for the UE 101 including what roles are preferred (e.g., close-up vs. wide angle, location within the event venue, etc.), movement preferences (e.g., whether the UE 101 can move within the event venue during the event), etc. The role assignment interaction information includes acceptances/rejections of suggested or assigned roles, role instructions, related tasks, etc.

In one embodiment, signaling may be performed during the event or while capturing the media items to provide additional role guidance. With this approach, the media platform 103 can determine one or more messages to direct capturing of media items based on the characteristics. Characteristics can be based on one or more parameters (e.g., one or more context vector parameters). Additionally or alternatively, the characteristics can be based on analysis of context vectors. For example, characteristics can include determinations of whether a particular view of the event is missing, can be improved (e.g., by increasing the altitude of the UE 101 capturing the media), or whether multiple users have overlapping media item creation and it could be advantageous to move one or the users to another angle. Corresponding instructions can be generated at the media platform 103 and sent to UEs 101 via server messages 403. These messages can be processed, rendered, and presented to users of the UEs 101.

One advantage of utilizing such messages is to support cooperation between users of UEs 101 to provide for a better compilation. Thus, the media platform 103 can determine whether two (or more) users that are recording the event by pointing their recording UEs 101 (i.e., cameras) in directions that intersect are actually capturing the same scene or different scenes. In this manner, it is possible to determine if there is an overlap in the captured area between the two users.

Further, the messages can be utilized to assign or update roles for maximizing the recorded area of the subject or event. Each user may choose not to capture an area of the stage, event, or subject that is already being covered by other users, and focus on another area, thus maximizing the number of available views of that subject or event (e.g., in case something unexpected or significant occurs). A possible variant of this concept would include making each user aware of the areas that are not being covered by others. As such, the messages 401 or 403 can provide information about deficiencies in coverage and/or instructions to follow (e.g., move left and point up or provide a view using a corresponding viewfinder).

Moreover, according to the system 100, each user could be able to receive information regarding from which angle a specific area is being captured by other users (i.e., which viewpoint the other users have). Thus, users may decide to capture the same area already being covered by others, but from a different viewpoint. As noted previously, explicit instructions may additionally be provided.

If, media platform 103, generating the automatic compilation of the subject or event deduces that two users are recording different scenes, then the compilation creation system may decide whether to use both or only one of these two content versions. This determination can be based on preferences or criteria for generating the compilation or video summary (e.g., visualizing the highest number of views of different areas in the event or subject location, visualizing the highest number of view-points with different angle of the same scene in the event or location). Range information can also be used for deducing overlaps in the captured view as well as for understanding whether a user is capturing something that is relatively close or far from the user. In fact, based on statistics (e.g., number of users pointing to a certain location of the whole event or subject area for the most of the time) and on metadata (context vectors), the media platform 103 can use range information for understanding whether the user is pointing at something that is not the main interest point of the event. For example, the user may be pointing at a friend who happens to be closer to the UE 101 compared to the main interest point (e.g., a music performance stage at a concert event). Using this information, the media platform 103 may decide to use that particular view only for a short time interval or not at all.

The media platform 103 can use the context vectors associated with multiple UEs 101 to determine role assignments that overlap of view between respective users of the UEs 101. Depending on context vectors captured by the devices and the analysis by the media platform 103, the users can get recommendation messages about the overlapping region mentioning parameters such as the accuracy of the determined overlap region, the viewing context of other users, etc. The media platform 103 may also use the captured content data to decide on a radius of interest and/or range of interest for a particular user or a set of users. The radius of interest and the range of interest are useful in defining at what distance from the user position it would be useful to know about an overlap between multiple users.

Using the compass orientation, location (GPS or indoor position), tilt angle, altitude, it is possible to determine the viewing axis of the user. Using the zoom, focal length, field of view it is possible to estimate the view cone for each user. Collating the view cones of multiple users and using the Radius of Interest for each device (e.g., using the ranging sensor) enables the media platform 103 to determine the intersection planes between users. This intersection volume determines the overlapping region between the users. Using the individual Radius of Interest of each device, the service can calculate the expected radius of interest for the event from locations where there are no users currently. If the overlapping region coincides with the radius of interest and within range of interest (e.g., a range of 10 m at a distance of 20 m from the users), the user can be notified that an overlap exists for the user's view of recorded content. The user can then either choose to modify the user's viewing angle to better cover the event or concert with a non-overlapping view or even choose to ignore the recommendation.

A focal length can also be used to determine if a user in a certain position is actually recording the common content of interest (e.g., the stage in case of a concert) or some object right in front of him (e.g., his friend). If an object of interest for a certain user is determined as "out of range" of another user's radius of interest, the other user need not be informed about potential overlap even if the user's viewing angle, location, etc. might indicate a potential overlap. By using these techniques, it can be possible to minimize false detections of overlaps between users.

Further, these server messages 403 can help the user make a more informed decision about how to capture the user's media items in a manner that can maximize the gain when the content from the multiple sources is combined. Thus, these server messages 403, in addition to providing information for maximal coverage of the event, may also provide information to the users about the redundancy of recorded content between different recorded media items.

The context vector signaled by the devices to the server can be sent over Hypertext Transfer Protocol (HTTP), Session Initiation Protocol (SIP), Real Time Streaming Protocol (RTSP), any other suitable transport mechanism. The context vector information may be transported as a Session Description Protocol (SDP)/XML/binary or any other suitable format. The signaling messages 603 from the media platform 103 can also be transported over HTTP/SIP/RTSP, included in SDP/XML/binary, or any such suitable format.

Figure 5:
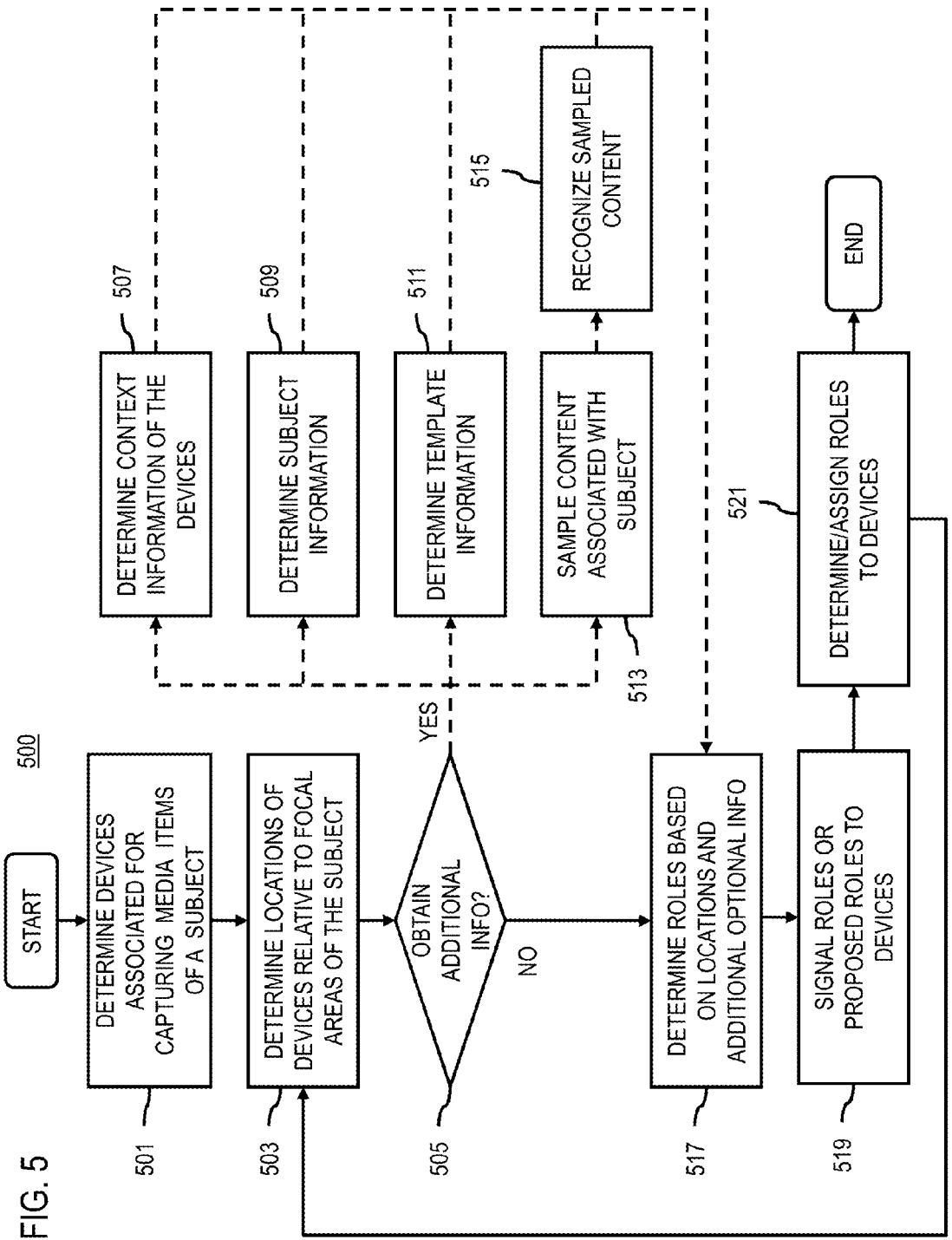
FIG. 5 is a flowchart of a process for determining roles for media generation and compilation, according to one embodiment.
Figure 13:
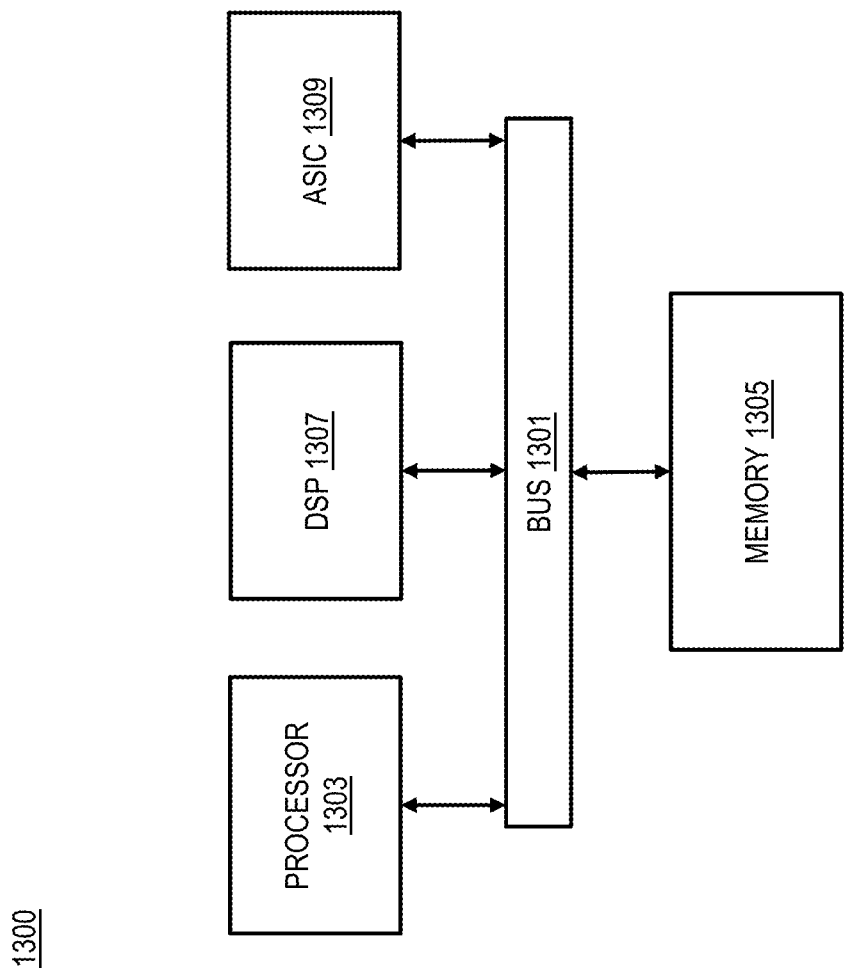
FIG. 13 is a diagram of a chip set that can be used to implement an embodiment of the invention.

FIG. 5 is a flowchart of a process for determining roles for media generation and compilation, according to one embodiment. In one embodiment, the media platform 103 performs the process 500 and is implemented in, for instance, a chip set include a processor and memory as shown in FIG. 13. Additionally or alternatively, one or more portions of the process 500 can be implemented via another device (e.g., the UE 101). In step 501, the media platform 103 determines one or more devices for generating media items of a subject (e.g., an event). In other words, the media platform 103 determines one or more UEs 101 that are participating to collectively record or capture media items of the subject using the approach described herein. In one embodiment, the determination is based on a subscription status to a service providing for collective recording. Under this scenario, UEs 101 with a subscription to the service may elect to participate in the collective recording. In addition or alternatively, the UEs 101 may form ad-hoc groups for the collective recording.

Next, the media platform 103 determines respective locations of the participating UEs 101 relative to one or more focal areas of the subject and/or the other participating UEs 101. In one embodiment, the UEs 101 capture context data or vectors as available depending on the sensors that they have (e.g., a compass, GPS, accelerometer, etc.) as well as content based sensing (e.g., audio sensing to extract context information like speaker direction; brightness sensing from the capture video, etc.). The context information is then transmitted to the media platform 103 for determining the relative locations. For example, the context vectors are compared to a map of the event or subject area and its focal areas to make the location determination.

In certain embodiments, the media platform 103 may collect additional optional data to assist in making the role determination (step 505). By way of example, the media platform 103 may optionally determine context information associated with the UEs 101, the subject, or a combination thereof (step 507). For example, the context information may include user device capabilities and/or features. In one sample use case, if the audio recording quality for one or more of the UEs 101 is high with respect to the other UEs 101, then the UEs 101 with the higher audio recording quality may be informed that the final compilation will very likely use the audio being recorded at the UEs 101. Thus, the media platform 103 may signal the selected UEs 101 to record from a position where the event audio is good (e.g., not too close to the loud speakers and not near noise sources like people who are shouting), without too much consideration about whether the video recording aspect.

Then, the media platform 103 can determine whether other UEs 101 have desired video capabilities. For example, UEs 101 equipped with cameras with high zoom capabilities can be asked to record the event from a far location, so that the UEs 101 can provide both wide angle views and close-ups of the event or subject with good quality. On the other hand, UEs 101 with poor zoom capabilities may be asked to stay closer to the event or subject focal points to maximize quality. In another example, UEs 101 with high resolution camera may be asked to spread throughout the event venue or subject area in such a way that high resolutions images are available for all or substantially all important camera positions or roles (e.g., close-up/left, close-up/central, close-up/right, wide-view/left, wide-view/central, wide-view/right).

Similarly, the media platform 103 may determine other context information (e.g., remaining recording space, remaining recording time, remaining battery life, etc.) for assigning roles. For instance, if a UE 101 has limited memory for storing a recording, the media platform 103 may ask the UE 101 to capture brief candid accent scenes of the audience.

In another embodiment, the context information may also include user preferences with respect to, for instance, preferred roles and/or movement. For example, a user associated with a participating UE 101 may prefer to follow a particular performer may be given preference for a role for capturing the performer if the UE 101 is in the proper location.

In one embodiment, the media platform 103 may determine context information about the subject or event itself to assist in making role assignments (step 509). For example, the media platform 103 may retrieve information identifying the subject, the venue, event program or schedule, expected performers, available camera positions, etc. The media platform 103 may then define roles or predetermine potential assignments based on the information. In another embodiment, the event information may be used to automatically generate an event or subject area map without user input or with only minimal user input.

In another embodiment, the media platform 103 determines to retrieve existing template information for determining locations, event maps, and/or making role assignments (step 511). In other words, after generating role assignments for a previous subject or event, the media platform 103 may store the assignments, compilations, and other related information for reuse for similar events. For example, if the multiple events represent different concerts by the same band, a template based on previous role assignments may be retrieved and reused.

In yet another embodiment, the media platform 103 may obtain additional information by sampling content presented at an event or otherwise related to the subject (step 513). The media platform 103 can then determine to perform a recognition of the sample (e.g., using any available content recognition algorithm) to identify the specific content (e.g., a particular song) being performed at the event (step 515). In this way, the media platform 103 may anticipate portions of the recognized content (e.g., be aware of an upcoming solo) and direct the participating UEs 101 accordingly (e.g., direct one or more of the UEs 101 to move to a better location or to be on alert for the upcoming event).

After collecting the additional information or if no additional information was desired, the media platform 103 defines or determines what roles to assign based on the determined locations and additional information (if any) (step 517). These roles or proposed roles are then signaled to the participating UEs 101 for acceptance or rejection (step 519). Based on the signaling, the media platform 103 determines or assigns the respective roles to the participating UEs 101 based, at least in part, on the respective location information with respect to the event or subject area map and other UEs 101 at the event (step 521). If additional information was collected, this additional information is also used for assigning the respective roles. By way of example, the media platform 103 may assign roles to ensure distribution of the participating UEs 101 within the event venue. More specifically, the media platform 103 may allocate more UEs 101 to cover focal areas of higher interest for the subject or event (e.g., a focal area corresponding to the principal vocalist) to increase redundancy of available source content for generating a compilation.

Moreover, the media platform 103 may also make dynamic adjustments to the assigned roles. For example, if there are more UEs 101 covering the close-up/left role and there are no or few users at the central side, then the media platform 103 may reassign some of the UEs 101 to a role at the central location.

In the case where there user-created group of UEs 101 (e.g., a group of friends at a concert), the UEs 101 can organize their roles in a more autonomous way. In general, each UE 101 can signal the media platform 103 the UEs 101 selected role. The UEs 101 can also signal an event or subject area of the map that the UE 101 intends to cover (e.g., by using a touch-based interface). Under this approach, the media platform 103 serves as a central hub for self-selected roles.

It is contemplated that the media platform 103 can update role assignments if the media platform 103 determines a change in the context information (e.g., location mobility, device capability or status, etc.) of one or more of the participating UEs 101. For example, if a particular UE 101 starts with the role of recording the drummer, but the media platform 103 receives context information that the UE 101 is moving around frequently, the media platform 103 may reassign the UE 101 to record images of the audience. In case of reassignment, the media platform 103 may signal the reassignment and request user acceptance/rejection of the reassignment.

It is noted that although various embodiments are described with respect to an event that is a musical concert, it is contemplated that the approach described here in applicable to any event including public speeches, plays, sporting events, festivals, etc.

FIGS. 6A and 6B are diagrams of event or subject area maps and respective user equipment locations used in the processes described with respect to FIG. 5, according to various embodiments. As discussed above, the media platform 103 may generate an event or subject area map to assist in signaling and/or determining roles for participating UEs 101. FIG. 6A depicts a diagram of an event map 501 and a map 505 of UEs 101 in attendance at the event. As shown, the event map 501 provides at least an approximate representation of the event stage area including detected focal areas 503a-503e. By way of example, the focal areas 503a-503e may correspond to individual performers. These focal areas 503a-503e may also be associated with different levels of importance as determined by the UEs 101, the media platform 103, or other entity. The map 505 of UEs 101 presents a map of the locations of UEs 101 within the event venue including both participating UEs 101 (indicated as black circles) and non-participating UEs 101 (indicated as white circles).

FIG. 6B depicts a map after the media platform 103 has made role assignments, signaled those assignments, and received acceptances/rejections from the participating UEs 101. By way of example, the media platform 103 offers potential roles to all identified participating UEs 101 (e.g., all the black circles). In this example, only six of the eleven participating UEs 101 have accepted their assigned roles. The accepting UEs 101 are depicted with respective cones representing their estimated fields of view for recording the event.

FIG. 7 is a flowchart of a process for generating a compilation of recordings of a subject based on audio cues, according to one embodiment. In one embodiment, the media platform 103 performs the process 700 and is implemented in, for instance, a chip set include a processor and memory as shown in FIG. 13. Additionally or alternatively, one or more portions of the process 700 can be implemented via another device (e.g., the UE 101). The In step 701, the media platform 103 receives or other has access to one or more recordings or media items generated using the multi-device recording approach described with respect to FIG. 5. The media platform 103 then correlates the recordings or media items based on the respective roles associated with the respective UEs 101 that made the recordings (step 703). By way of example, the correlation may be made based on metadata associated with the media items, information stored in a role assignment table (e.g., a table specifying a role identifier and corresponding UE 101 identifier), or other similar role association information.

Under the approach described herein, the media platform 103 determines one or more audio cues associated with the media items by, for instance, extracting the audio track or portions of the audio track from the media items (step 705). The media platform 103 then determines whether it is to perform additional analysis of the audio cues (step 707). As discussed previously, the media platform 103 may perform any of several optional analyses.

The process of steps 709-719 represent optional audio analysis steps that can be performed by the media platform 103. The steps 711-719 are explained with reference to FIGS. 8A-8E which are diagrams depicting processes for segmenting recordings or media items for compilation.

Step 709 represents an embodiment in which the media platform 103 uses information regarding the role of each of the UEs 101 (e.g., a camera role) within a multi-device recording session. More specifically, the role information combined with an algorithm that extracts semantic audio cues from the audio tracks of the recordings or media items. The output of the algorithm would be which performer (e.g., a performer corresponding to a particular focal area covered in an assigned role) of the recording or media item is predominant for a particular segment of the audio track (e.g., during the vocal parts of a song, the singer would be the predominant performer, while during an instrumental solo the instrumental performer would be the predominant performer. Thus, based on the output of this algorithm, the media platform 103 is able to determine for each time slot of the compilation which performer is predominant. The segments (e.g., video segments) corresponding to the performer can then be determined based on the roles assigned to the recording UE 101 (e.g., footage is taken from the UE 101 assigned a role to cover the determined performer at the specified time slot) (see, e.g., FIG. 8A). In a case where no predominant performer can be determined for a particular time slot, the media platform 103 may select a segment with any of the performers. In this way, no processing of the video is needed to segment the recording, thereby reducing potential processing, memory, etc. resource burdens.

In one embodiment, the audio track given as input to the algorithm for predominant performer identification should be of a minimum level of quality (e.g., clarity, lack of noise, etc.). In certain embodiments, to make the audio analysis more robust, the audio tracks from all of the received recordings are used as input to the algorithm or classifier. In other words, the classifier generates the segmentation information (e.g., based on which performer or instrument is predominant) based on all available audio tracks. For example, using data from five overlapping recordings for a certain segment, the algorithm may determine that in four of the five recordings the determined predominant instrument is the guitar and in one case, the predominant instrument is the bass. Accordingly, the predominant instrument for that segment is determined to be the guitar based on a majority rule.

In step 711, the media platform 103 determines tempo information from the audio tracks for use in a beat tracking algorithm to obtain the beat sequence of the input audio track. The output of the algorithm is, for instance, a series of timestamps representing the time instances (with respect to the beginning of the audio track) at which a beat in the input audio track occurs. In one embodiment, the analysis also determines an intensity of the beat (e.g., a volume or other value in the frequency domain). The series of timestamps is then used by the media platform 103 as reference points for switching from one video segment to another (see, e.g., FIG. 8C). Beat timestamp and corresponding intensity levels enables calculation of the music time signature. For example, most musical tracks follows a 4/4 time signature. In this case, it is possible to calculate the time signature of the input audio track and then make the corresponding segment switch for the video based on the time signature (see, e.g., FIG. 8B).

In one embodiment, the process of step 711 may be used in combination with step 709 as follows. The media platform 103 may decide to switch the time instances corresponding to beat timestamps only within the temporal slots for which there is no predominant performer. In another embodiment, if there are two or more UEs 101 have the role of recording a specific performer, then if the that performer is the predominant one in a time slot, the media platform 103 may switch from one view to another (e.g., with the same camera role) at time instances corresponding to the beat timestamps. Furthermore, a temporal threshold may be used by the media platform 103 in order to not switch from one segment to another too quickly (e.g., switch only after N beats, wherein N is a positive integer representing the threshold).

In step 713, the media platform 103 may determine mood information to determine which modality to apply when switching from one segment to another. By way of example, the mood information is determined via an audio mood classification algorithm that takes the audio tracks of the recordings as input and return a sequence of detected music moods with associated timestamps that define start and end of such classified moods with the audio tracks. In some cases, the entire track may be classified as on mood class. The output mood information is then used by the media platform 103 for choosing appropriate transition types to use when switching from one segment to another in the compilation. The process for choosing the transition types can be based on, for instance, one or more rules (see, e.g., FIG. 8D). For example, if the detected mood for a portion or segment of the audio track is "sad" or "melancholic", a possible rule would be to apply a smooth transition (e.g., cross-fading) to the switches occurring in that portion. On the other hand, if the mood is "happy" or "aggressive", the media platform 103 may apply simple hard cuts to the switches.

In another embodiment, the mood information may be used to enable the media platform 103 to decide the period of beats to consider as a switching or edit point (e.g., expressed in terms of an integer number N of consecutive beats). If the detected musical mood in a specific segment is "aggressive" or "happy", then the system may decide to use a shorter period of beats as the switching or edit points between different segments (e.g., only one or two beats). This period or duration of the transition can also be specified by user preference. If the mood information indicates the mood is "sad", "melancholic", or "relaxed" then a longer transition period can be applied (e.g., four beats).

In step 715, the media platform 103 determines audio structure information based on one or more audio tracks of the recordings. In one embodiment, the audio structure information can be used to switch between recording segments that are captured from different events that include at least in part performance of the same or similar content. In other words, step 715 is directed towards addressing the problem of switching from one performance of an audio track in one event to another performance of the same audio track in another event. As previously noted, the problem is represented by potentially different tempos and/or time signatures between the two events. If a user request that the media platform 103 generate a compilation include at least two different performances of the same audio track, then the media platform 103 uses an algorithm that analyzes the input audio track to extract its inherent audio structure (e.g., musical structure such as intro, verse, chorus, bridge, solo, outro).

Figure 8A:
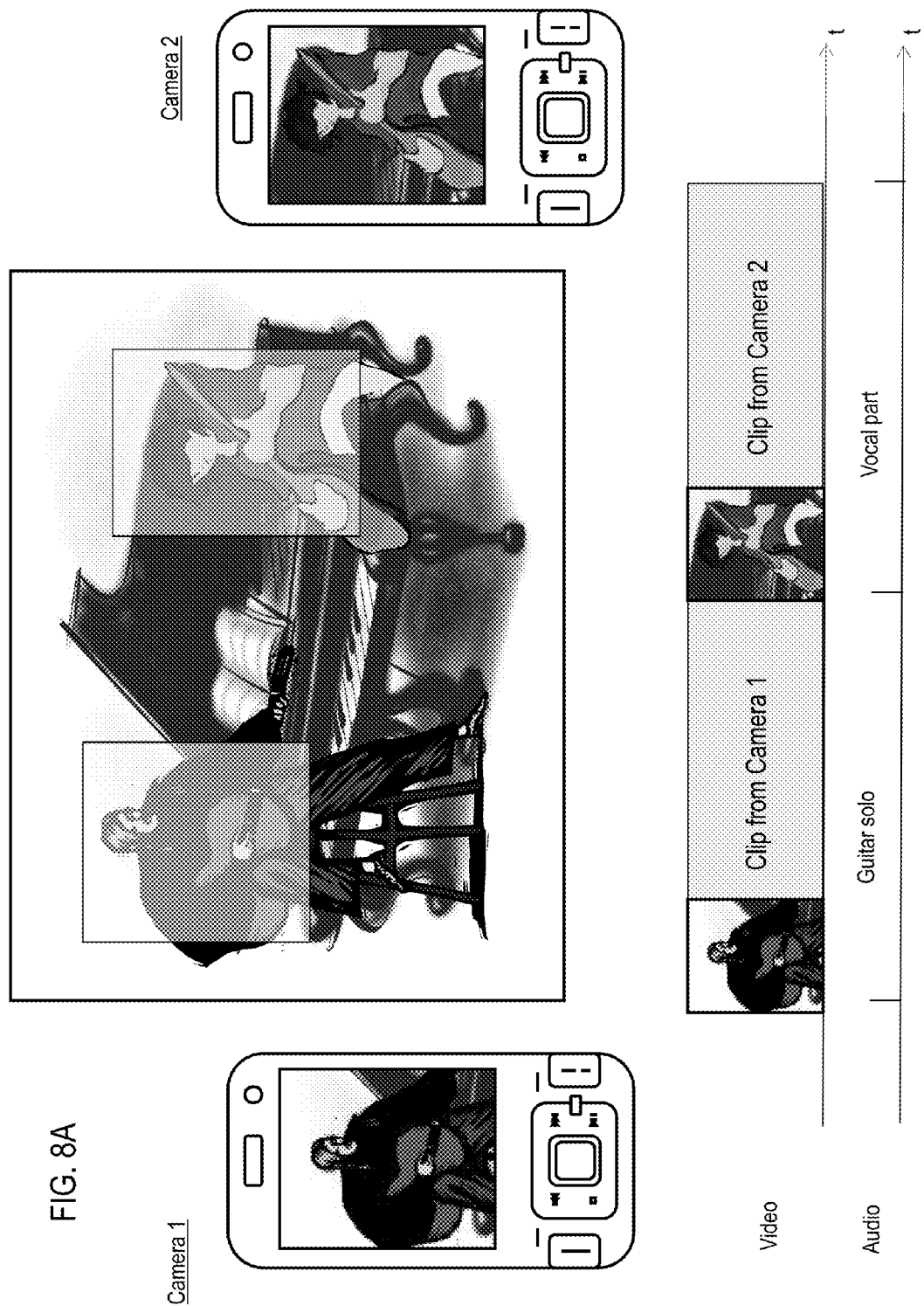
Figure 8E:
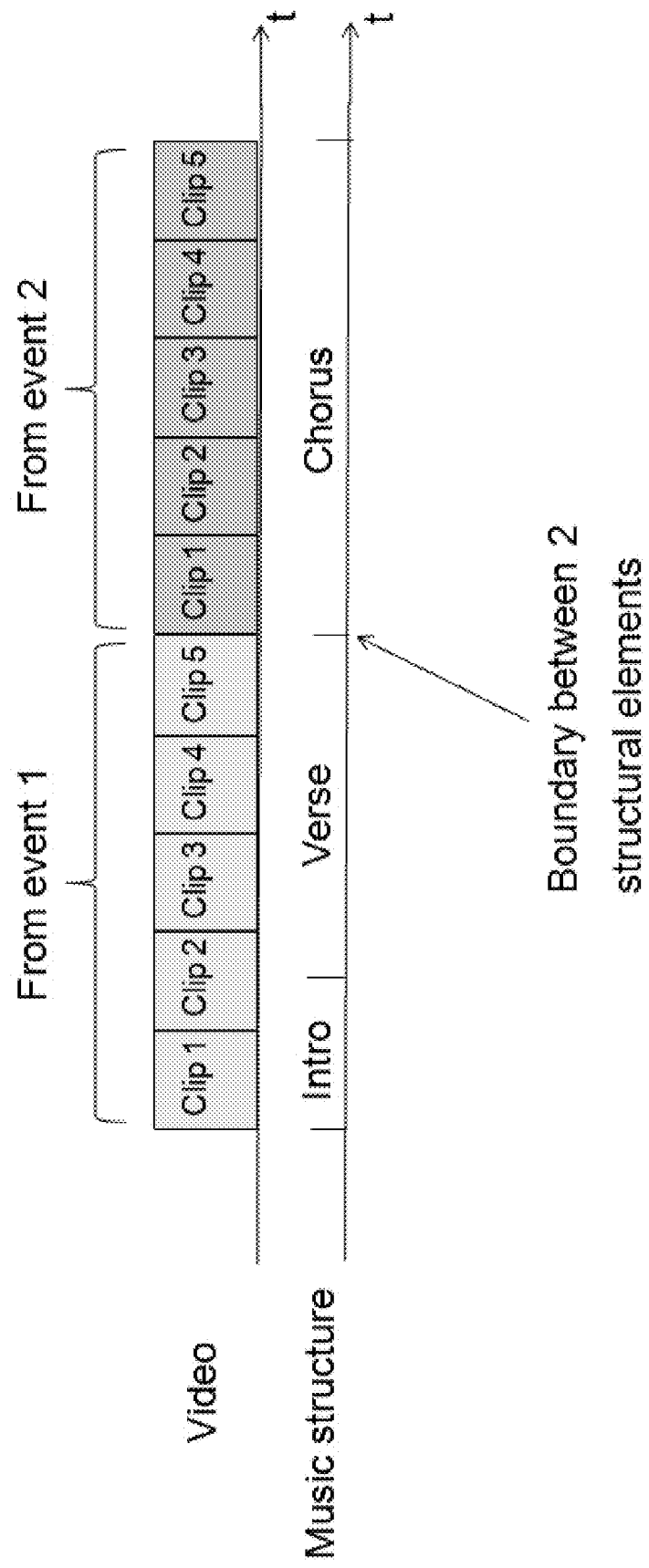

In one embodiment, the media platform 103 switches from one performance to another (of the same audio track) at time instances corresponding to the boundaries between two adjacent audio structural elements (e.g., at the boundary between verse and chorus) (see, e.g., FIG. 8E). The reason for applying such an approach is that even though the tempo and/or time signatures do not usually change among different structural elements of the same audio track or performance, these elements can be quite different from each other. Therefore, switching performances at this boundary would be more appealing to most users.

It is noted that a good quality version of the audio track may be needed to perform the analyses discussed above. Accordingly, in step 717, the media platform 103 can sample the audio cues and/audio tracks and then perform a recognition of the samples (step 719). The recognition information can then be used to used determine corresponding to a reference content or audio track. In one embodiment, the reference audio track may be obtained from a professional audio recording system present at the event. In other words, if the recorded audio tracks do not have sufficient quality for performing the audio analysis, then professional audio sources may be utilized (e.g., from a mixer on the stage or television broadcast). If no professional recording is available, the recognition information may be used to obtain a studio copy of track for analysis. Differences between the studio track and the live recording (e.g., timing, pitch, etc.) can then be used to adjust the analysis and resulting segmentation of the recordings.

In step 721, the media platform 103 determines to generate a compilation of at least a portion of the recordings based on the roles, the audio analyses described above, or a combination thereof.

Figure 9:
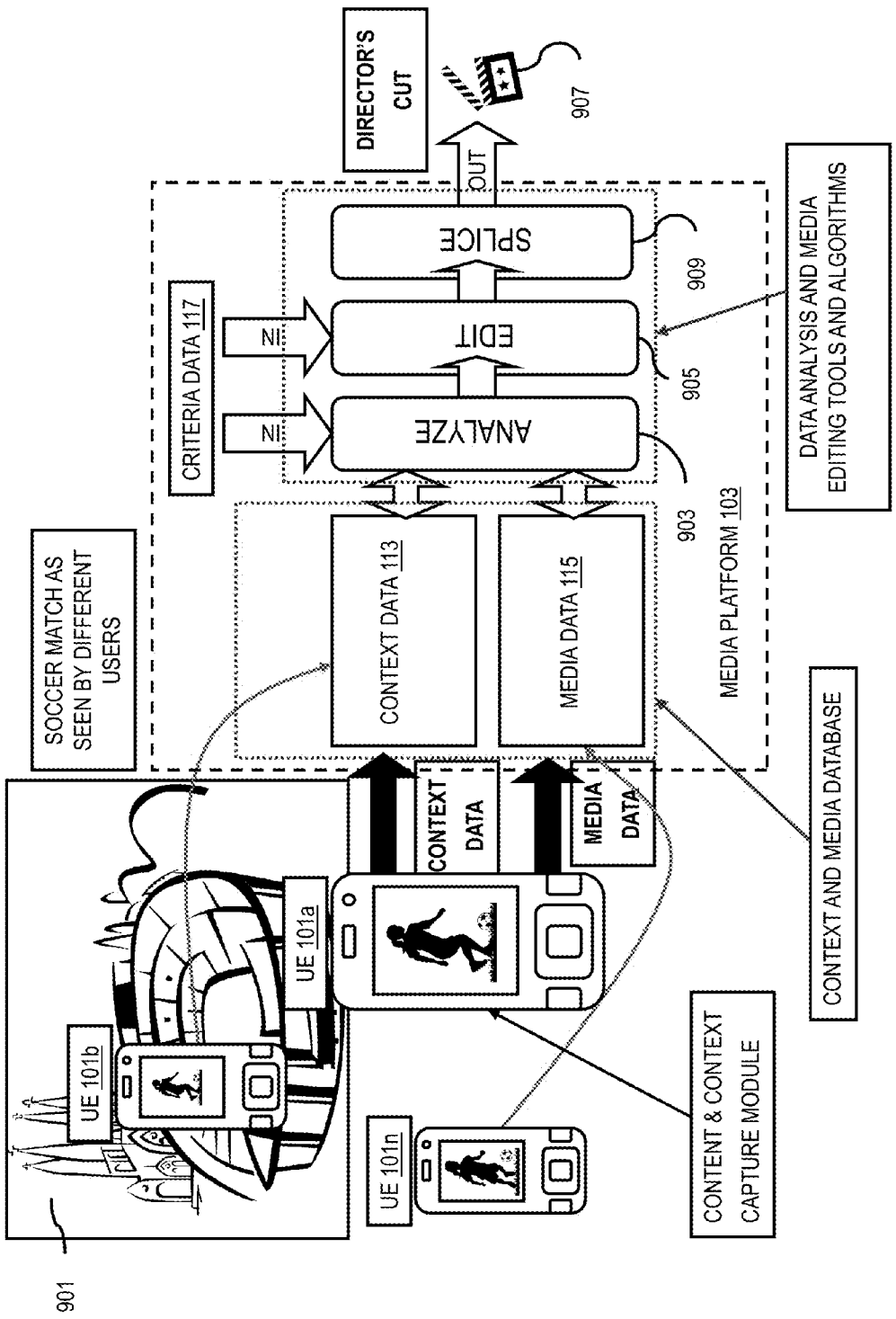
FIG. 9 is a diagram of utilizing a media platform to generate a compilation of media items, according to one embodiment.

FIG. 9 is a diagram of utilizing a media platform to generate a compilation of media items, according to one embodiment. In this embodiment, users utilize UEs 101a-101n at an event 901 (e.g., a soccer event) for multi-device recording according to assigned roles. At the event, media items as well as associated context vectors are sent from the UEs 101 to the media platform 103. The media platform 103 can store this information in the context data database 113 and/or media data database 115. In certain embodiments, the context data database 113 can be populated utilizing one or more scripts to import serialized context data. The serialization helps facilitate access of the context vectors.

During the event 901, or at a later time, the media platform 103 can output a compilation (e.g., a director's cut) based on the context vectors, media items, and criteria stored in a criteria data database 117. In addition or alternatively, the compilation can be based, at least in part, on the roles associated with the UEs 101 recording the event 401 and/or the audio cues or audio tracks associate with recordings or media data 115. As previously noted, sensor data can be stored as context vectors and may be stored in any format, such as RDF/XML files, similar suitable formats, or proprietary formats. The UE 101 clock can be synchronized with a common shared clock between all of the UEs 101 recording content that is used for automatic video editing at the media platform 103. The common shared clock may be a GPS clock, wall clock time, or any suitable clock that is accurate and stable. For example, a cellular UE 101 can be synchronized based on a network clock. Also, a software implementation may record accurate timestamps for each sensor data reading in order to correctly interpret the actions of the content capturer (e.g., panning, tilt, etc.). The sensor data from the compass, accelerometer, altimeter, etc. can be transferred either in real-time, in a non real-time fashion, or at any convenient time to the media platform 103 along with the captured media items.

The media platform 103 can analyze 903 the media items and context data to determine one or more events associated with media items (e.g., a determination that the UEs 101 are at the event 901). This may be based on timing information as well as orientation information, geo-location information, and view focus determinations. One or more data analysis 903 and media editing 905 tools can be utilized in determining the output compilation 907. Once various segments from media items are selected during the editing process 405, the media items are spliced 909 together to generate the compilation. The analysis, editing, and splicing are further detailed in FIG. 8.

Figure 10:
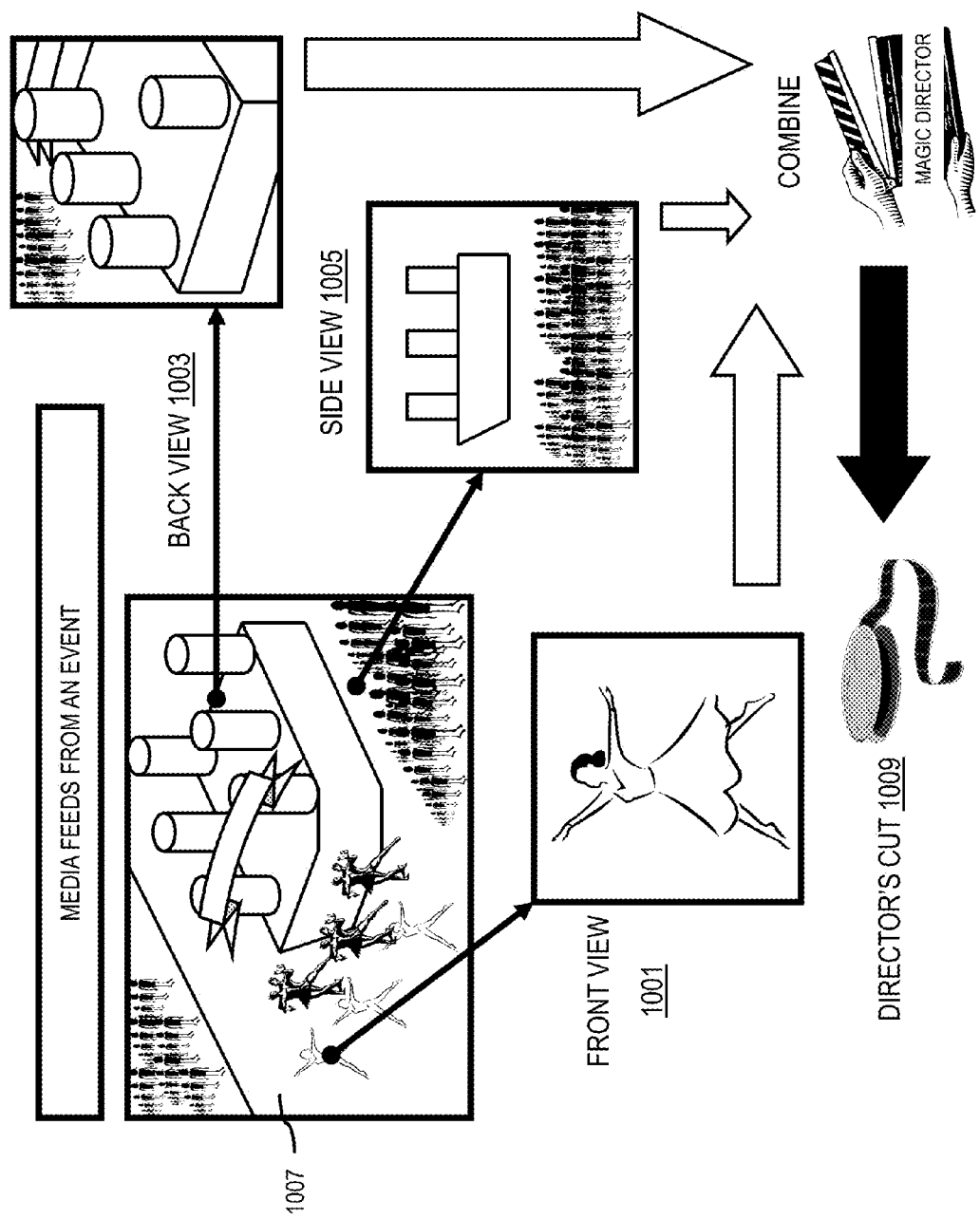
FIG. 10 is a diagram of views of media items collected by user equipment utilized to generate a compilation, according to one embodiment.

FIG. 10 is a diagram of views of media items collected by user equipment utilized to generate a compilation, according to one embodiment. According to this embodiment, various UEs 101 capture media items and context vectors associated with various views 1001, 1003, 1005 of an event 1007 based, at least in part, on roles device for the respective UEs 101. As noted above, the timing information associated with the UEs 101 can be synchronized. As such, it can be determined that one or more of the views 1001, 1003, 1005 occur at the same time. These views 1001, 1003, 1005 can be determined to be associated with one or more perspectives of the event 1007. Further, the views 1001, 1003, 1005 can be utilized in generating a director's cut compilation 1009. In certain embodiments, the compilation 1009 may include more than one view in a frame (e.g., creating a 360 degree angle of viewing by including more than one view 1001, 1003, 1005). Additionally or alternatively, one or more views may be filtered out based on one or more criteria including the role of the recording UE 101 and/or extracted audio cues. For example, the primary event may be determined to be associated with the front view 1001 (e.g., because more media items are associated with the front view), while some UE context vectors were associated with the side view 1905, and even less with the back view 1003. As such, the compilation 509 can include these views proportionally or with respect to criteria.

Figure 11B:
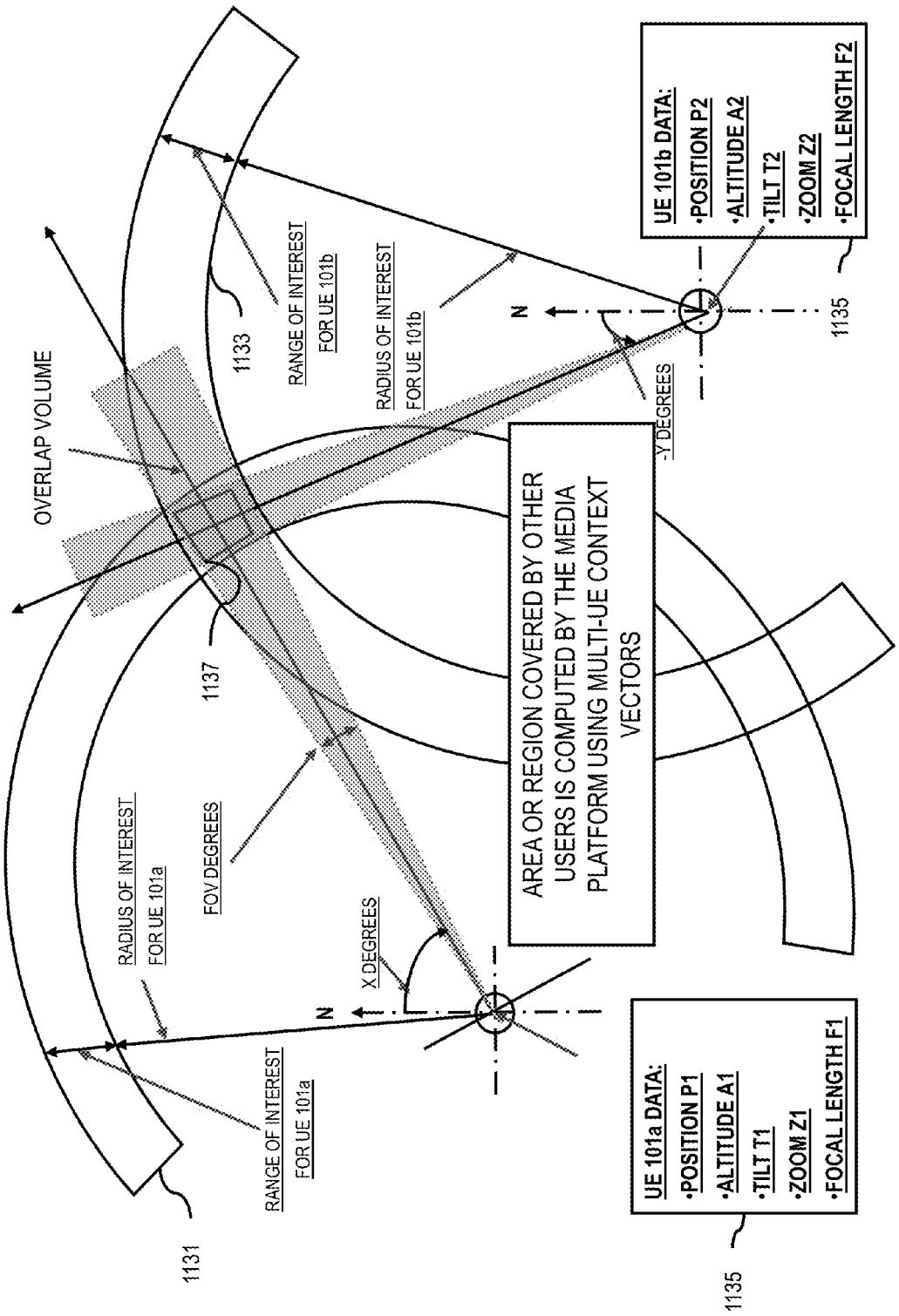

FIGS. 11A-11C are map diagrams displaying example maps of locations utilized to generate context vector information, according to various embodiments. The determination of the focal points or areas may be further described utilizing the map 1100 of FIG. 11A. The map 1100 displays multiple users 1101, 1103, 1105 utilizing UEs 101 to transmit event information to the media platform 103. Magnetometer information may be utilized to determine an angle with respect to north. This angle can be utilized to determine vectors 1107, 1109, 1111 pointing towards a location that the user is interested in capturing media about from the user's location 1101, 1103, 1105. The user's location 1101, 1103, 1105 may be stored and utilized using latitude and longitude information and/or other location coordinate information (e.g., GPS coordinates). The vectors 1107, 1109, 1111 may be analyzed to determine one or more intersection points, which may be considered a focal point 1113. In certain embodiments, there may be more than one focal point 1113 associated with a determined event. Further, the location information may include an altitude and the accelerometer data may be utilized to add a three dimensional component to the focal point 1113. With this data, the vectors may be analyzed in a three dimensional space. Further, coarse determinations may be made with regard to the accelerometer data (e.g., whether each user has a lower vantage point or a higher vantage point in relation to the focal point 1113).

Further, an area of extent associated with the event may be determined. A perimeter may be determined using orthogonal boundary lines 1115, 1117, 1119. These lines may be orthogonal to the determined vectors 1107, 1109, 1111.

Moreover, if there are gaps in the perimeter, the focal point 1113 may be utilized to determine the boundary. In other embodiments, the area of extent may be determined to be an area based on a radius from the focal point 1113 to the furthest user. Additionally, the structure of the event may be determined based on the focal point and the area of extent. For instance, if the focal point 1113 is in the sky, it may be determined that the structure of the event is a sky event. Moreover, if the focal point 1113 is only captured from a particular side, it can be determined that the event faces a certain direction from the focal point 1113 (e.g., the event faces south west from the focal point 1113). This structural information may be used to determine a type of event associated with the event. In this manner, the structure of the event may be determined to be a stage facing the determined direction, a sky event, a stadium event (if it is determined that the UEs 101 have a higher vantage point than the focal point 1113), a building event (e.g., if the UEs 101 are within a building) etc. When the focal point 1113 is determined and area of extent is determined, the area of extent may be associated with a map. This map may be utilized to disseminate information about events to the users of the media platform 103 (e.g., using messages described in FIG. 4).

FIG. 11B is an example map diagram displaying a map of locations utilized to generate context vector information, according to one embodiment. This map more particularly points out a radius of interest 1131, 1133 of users capturing media items using UEs 101. These ranges of interest can be utilized in determination of context data. Further, as noted above, UEs 101 can capture media as well as context vector information 1135. Moreover, as described in FIG. 6, a real-time communication sub-system can be utilized to receive instructions or guidance from the media platform 103, which can coordinate between multiple UEs 101.

As such, users are made aware of already covered areas of the event. By having a real-time bi-directional channel between each user's UE 101 and the media platform 103 (e.g., via cellular radio network, WLAN, or other networking technologies), one or more UEs 101 can continuously send both location data and compass data, as well as other context vector information (e.g., in RDF/XML format), at a given rate to the media platform 103. The media platform 103 can then send back to each UE 101 information about areas already being covered by the other users. Then, each user can be presented on his/her viewfinder a rectangle (or other form of visual representation) that highlights the already covered area (if it lies inside the currently captured area of that user). A different viewfinder view would display the negative view, i.e., the areas of the event that have not been covered by any user recorded video.

The angle from which the already covered areas are being captured by the other users may additionally be displayed by modifying the shape of the rectangle accordingly, by drawing an arrow that would represent the pointing direction (e.g., as shown in FIG. 9A).

To determine an overlapping region 1137 (e.g., focus point) in the viewfinders of two or more UEs 101, context data from the range sensor can be used to generate information about the overlapping view more accurately. The data that may be recorded by each UE 101 that is recording media items. Moreover, each of the UEs 101 can be associated with a radius of interest based on the range sensor. The range of interest and/or zoom level of the UEs 101 with respect to the overlapping region 1137 can be utilized as parameters to determine a media compilation based on criteria associated with such a range and/or zoom level. For example, it may be advantageous, in certain circumstances, to get a more enlarged view of the focus region (e.g., during a concert) or a broader view of the focus region (e.g., during fireworks).

Each of the recording UEs 101 can then display rectangle-like window(s) on the viewfinder for making the user aware of the areas that are recorded by other users. This can enable cooperation in event recording. If the transmission of the information about the common covered areas does not happen in real time to the several users, this information can be used later by the server to determine what viewpoint(s) to use in a video summary or compilation.

FIG. 11C additionally points out another use of the range sensor. The range module 204 can be utilized to determine whether an object 1151 is obstructing a view of a UE 101*a* from a focus point 1153. Because the range 1155 of the first UE 101 from the focus of the UE 101*a* is smaller than the distance to the focus point 1153 (e.g., based on one or more other UEs 101 and/or ranges (e.g., range 1157) associated with the other UEs 101), it can be determined that UEs 101*a* and 101*b* are associated with different scenes. In certain scenarios, based on one or more criteria, the obstructing object 1151 can be included in the compilation and/or removed from the compilation. Such criteria can include a determination of whether the UE 101*a* is even associated with the same event and/or if other UEs (not shown) are also focused towards the object 1151. In certain scenarios, the event type may be utilized to determine the criteria. For example, in a concert with multiple focuses and/or stages, it may be more likely that the object 1151 includes information that users may wish to include in a director's cut compilation.

Further, panning may be a focus of certain criteria. Panning operations can, in certain embodiments, be classified as intentional or non-intentional for being utilized for selection criteria to incorporate a segment associated with the panning in a compilation. This can be done by determining the frequency of one or more panning events, the speed of each panning operation, the actual orientation values (e.g., from which the direction of each panning can be deduced—clockwise or counterclockwise) of panning operations. For example, if the system 100 detects at a close range 1155 a series of fast panning operations over a narrow angle, which happen with high frequency and alternately in opposite directions, then those panning events may be classified as non-intentional because most likely the operations are due to horizontal camera shaking In another example, if the user has not zoomed in and the scene being captured is not very close to the UE 101 (e.g., at a longer range 1157), a panning operation over a small angle does not change the viewing angle of the scene greatly, thus it can be classified as non-intentional and then ignored during the media editing.

An intentional panning event detected on one of the UEs 101 can signify that a new view of the scene is available and therefore an automatic video editing process may include the video segment recorded by that UE 101 just after the panning event has completed. This may additionally be based on one or more criteria and/or whether or not one or more other users focus on the new focus point. Thus, the detected intentional panning events can be used as event points for switching camera views. Use of event points is further detailed in FIG. 8. Moreover, other classifications of panning events can be made and utilized for detecting event points and/or selection of media segments for inclusion in a media compilation.

Another classification of panning events is based on the speed of the panning operation by using the orientation values and the associated timestamps. In this manner, panning events can be classified into different categories according to different speeds (e.g. multiple speed categories). Furthermore, these speed categories can be associated to semantically meaningful classes. For example a panning operation that is slow and that covers a wide angle can be associated to the class "panoramic panning," a rapid change in the viewing angle can be associated to the class "rapid change of the main focus," or the like. The obtained classes can then be used by an automatic video editing algorithm for deciding what type (e.g., in terms of speed) of panning operation to include into the final director's cut, based on different policies (e.g. user preferences, criteria, rules, etc.).

The classification of intentional vs. non-intentional panning and the classification into semantically meaningful panning classes can be reinforced by exploiting the availability of multiple UEs 101 that are recording the same event, for example, by looking for a correlation of one or more characteristics of the panning operations made by different users. Regarding the intentional vs. non-intentional classification, if for many of the participating users the system detects a panning operation within a certain time interval (e.g., almost simultaneously), then it can mean that the panning operation made by these users are most likely intentional (e.g., a sub-event or change in focus to a different aspect of a performance). Regarding the classification into semantically meaningful panning classes, the availability of information about the frequency, speed, timing, and orientation values of the panning operations of multiple users can help to better understand what type of panning each user is doing from a semantic point of view. If only one user in a certain time interval is doing a slow and wide panning, then that user is most likely doing a panoramic panning. Instead, if many of the users are doing a slow and wide panning operation within a similar time interval, then it could mean that the users are attempting to follow and capture something that is slowly moving.

Another classification of panning events is based on the orientation with respect to magnetic north of the image capture device of a UE 101 when panning has completed. According to this classification, panning events can be marked either as inside or outside the region of interest. The region of interest can be determined either according to end-user preferences or automatically by looking at the statistics in the orientations recorded by media items associated with the event. For example, if most of the users are recording for the most of the time towards orientations between −30 degrees and +30 degrees, then the region of interest is set to be within this range. An automatic video editing algorithm may then choose not to include video segments recorded by UEs 101 just after panning operations have ended outside the region of interest. Additionally or alternatively, if it is determined that the focus of users has changed to that new area, the video editing algorithm may include the content.

The processes described herein for determining roles for media generation and compilation may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 12:
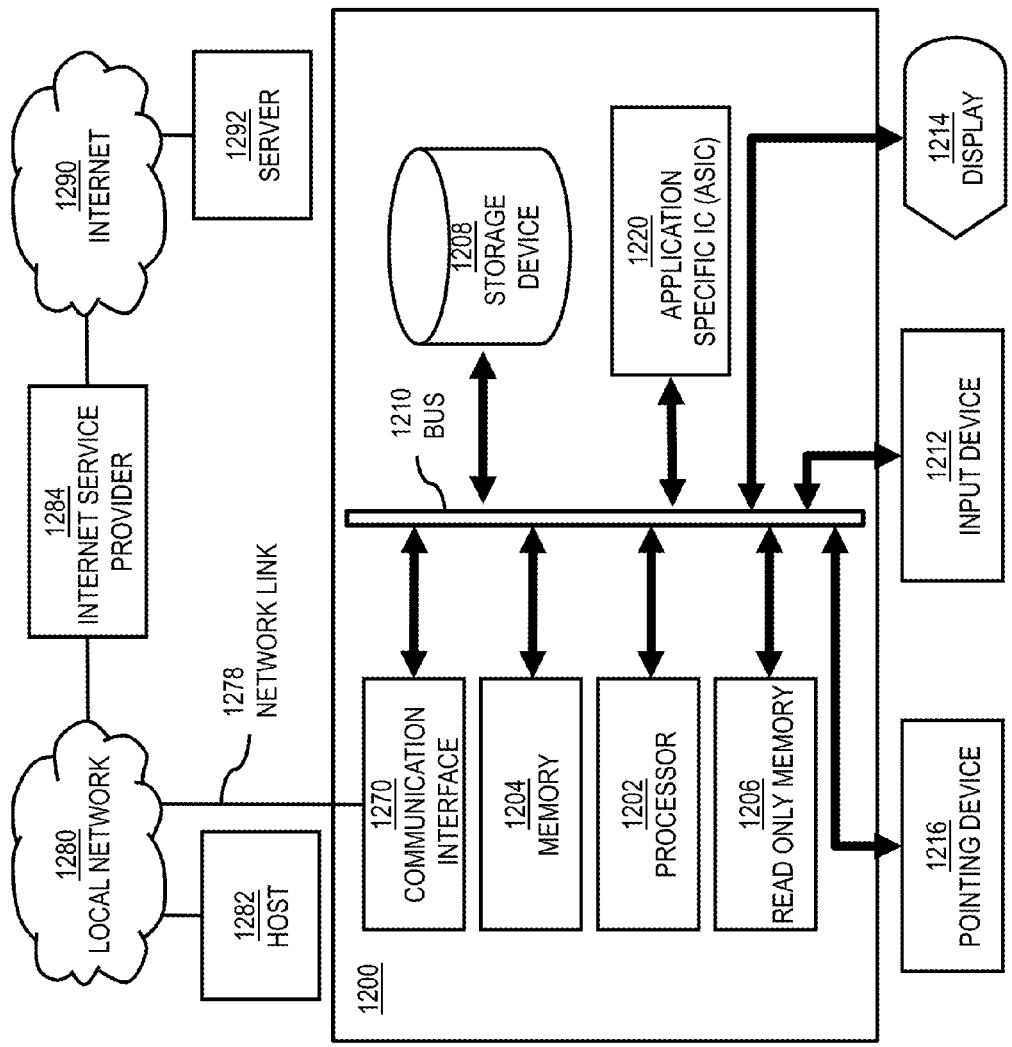
FIG. 12 is a diagram of hardware that can be used to implement an embodiment of the invention.

FIG. 12 illustrates a computer system 1200 upon which an embodiment of the invention may be implemented. Although computer system 1200 is depicted with respect to a particular device or equipment, it is contemplated that other devices or equipment (e.g., network elements, servers, etc.) within FIG. 12 can deploy the illustrated hardware and components of system 1200. Computer system 1200 is programmed (e.g., via computer program code or instructions) to determine roles for media generation and compilation as described herein and includes a communication mechanism such as a bus 1210 for passing information between other internal and external components of the computer system 1200. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1200, or a portion thereof, constitutes a means for performing one or more steps of determining roles for media generation and compilation.

A bus 1210 includes one or more parallel conductors of information so that information is transferred quickly among devices coupled to the bus 1210. One or more processors 1202 for processing information are coupled with the bus 1210.

A processor (or multiple processors) 1202 performs a set of operations on information as specified by computer program code related to determining roles for media generation and compilation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1210 and placing information on the bus 1210. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1202, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1200 also includes a memory 1204 coupled to bus 1210. The memory 1204, such as a random access memory (RAM) or any other dynamic storage device, stores information including processor instructions for determining roles for media generation and compilation. Dynamic memory allows information stored therein to be changed by the computer system 1200. RAM allows a unit of information stored at a location called a memory address to be stored and retrieved independently of information at neighboring addresses. The memory 1204 is also used by the processor 1202 to store temporary values during execution of processor instructions. The computer system 1200 also includes a read only memory (ROM) 1206 or any other static storage device coupled to the bus 1210 for storing static information, including instructions, that is not changed by the computer system 1200. Some memory is composed of volatile storage that loses the information stored thereon when power is lost. Also coupled to bus 1210 is a non-volatile (persistent) storage device 1208, such as a magnetic disk, optical disk or flash card, for storing information, including instructions, that persists even when the computer system 1200 is turned off or otherwise loses power.

Information, including instructions for determining roles for media generation and compilation, is provided to the bus 1210 for use by the processor from an external input device 1212, such as a keyboard containing alphanumeric keys operated by a human user, or a sensor. A sensor detects conditions in its vicinity and transforms those detections into physical expression compatible with the measurable phenomenon used to represent information in computer system 1200. Other external devices coupled to bus 1210, used primarily for interacting with humans, include a display device 1214, such as a cathode ray tube (CRT), a liquid crystal display (LCD), a light emitting diode (LED) display, an organic LED (OLED) display, a plasma screen, or a printer for presenting text or images, and a pointing device 1216, such as a mouse, a trackball, cursor direction keys, or a motion sensor, for controlling a position of a small cursor image presented on the display 1214 and issuing commands associated with graphical elements presented on the display 1214. In some embodiments, for example, in embodiments in which the computer system 1200 performs all functions automatically without human input, one or more of external input device 1212, display device 1214 and pointing device 1216 is omitted.

In the illustrated embodiment, special purpose hardware, such as an application specific integrated circuit (ASIC) 1220, is coupled to bus 1210. The special purpose hardware is configured to perform operations not performed by processor 1202 quickly enough for special purposes. Examples of ASICs include graphics accelerator cards for generating images for display 1214, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1200 also includes one or more instances of a communications interface 1270 coupled to bus 1210. Communication interface 1270 provides a one-way or two-way communication coupling to a variety of external devices that operate with their own processors, such as printers, scanners and external disks. In general the coupling is with a network link 1278 that is connected to a local network 1280 to which a variety of external devices with their own processors are connected. For example, communication interface 1270 may be a parallel port or a serial port or a universal serial bus (USB) port on a personal computer. In some embodiments, communications interface 1270 is an integrated services digital network (ISDN) card or a digital subscriber line (DSL) card or a telephone modem that provides an information communication connection to a corresponding type of telephone line. In some embodiments, a communication interface 1270 is a cable modem that converts signals on bus 1210 into signals for a communication connection over a coaxial cable or into optical signals for a communication connection over a fiber optic cable. As another example, communications interface 1270 may be a local area network (LAN) card to provide a data communication connection to a compatible LAN, such as Ethernet. Wireless links may also be implemented. For wireless links, the communications interface 1270 sends or receives or both sends and receives electrical, acoustic or electromagnetic signals, including infrared and optical signals, that carry information streams, such as digital data. For example, in wireless handheld devices, such as mobile telephones like cell phones, the communications interface 1270 includes a radio band electromagnetic transmitter and receiver called a radio transceiver. In certain embodiments, the communications interface 1270 enables connection to the communication network 105 for determining roles for media generation and compilation.

The term "computer-readable medium" as used herein refers to any medium that participates in providing information to processor 1202, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1208. Volatile media include, for example, dynamic memory 1204. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1220.

Network link 1278 typically provides information communication using transmission media through one or more networks to other devices that use or process the information. For example, network link 1278 may provide a connection through local network 1280 to a host computer 1282 or to equipment 1284 operated by an Internet Service Provider (ISP). ISP equipment 1284 in turn provides data communication services through the public, world-wide packet-switching communication network of networks now commonly referred to as the Internet 1290.

A computer called a server host 1292 connected to the Internet hosts a process that provides a service in response to information received over the Internet. For example, server host 1292 hosts a process that provides information representing video data for presentation at display 1214. It is contemplated that the components of system 1200 can be deployed in various configurations within other computer systems, e.g., host 1282 and server 1292.

At least some embodiments of the invention are related to the use of computer system 1200 for implementing some or all of the techniques described herein. According to one embodiment of the invention, those techniques are performed by computer system 1200 in response to processor 1202 executing one or more sequences of one or more processor instructions contained in memory 1204. Such instructions, also called computer instructions, software and program code, may be read into memory 1204 from another computer-readable medium such as storage device 1208 or network link 1278. Execution of the sequences of instructions contained in memory 1204 causes processor 1202 to perform one or more of the method steps described herein. In alternative embodiments, hardware, such as ASIC 1220, may be used in place of or in combination with software to implement the invention. Thus, embodiments of the invention are not limited to any specific combination of hardware and software, unless otherwise explicitly stated herein.

The signals transmitted over network link 1278 and other networks through communications interface 1270, carry information to and from computer system 1200. Computer system 1200 can send and receive information, including program code, through the networks 1280, 1290 among others, through network link 1278 and communications interface 1270. In an example using the Internet 1290, a server host 1292 transmits program code for a particular application, requested by a message sent from computer 1200, through Internet 1290, ISP equipment 1284, local network 1280 and communications interface 1270. The received code may be executed by processor 1202 as it is received, or may be stored in memory 1204 or in storage device 1208 or any other non-volatile storage for later execution, or both. In this manner, computer system 1200 may obtain application program code in the form of signals on a carrier wave.

Various forms of computer readable media may be involved in carrying one or more sequence of instructions or data or both to processor 1202 for execution. For example, instructions and data may initially be carried on a magnetic disk of a remote computer such as host 1282. The remote computer loads the instructions and data into its dynamic memory and sends the instructions and data over a telephone line using a modem. A modem local to the computer system 1200 receives the instructions and data on a telephone line and uses an infra-red transmitter to convert the instructions and data to a signal on an infra-red carrier wave serving as the network link 1278. An infrared detector serving as communications interface 1270 receives the instructions and data carried in the infrared signal and places information representing the instructions and data onto bus 1210. Bus 1210 carries the information to memory 1204 from which processor 1202 retrieves and executes the instructions using some of the data sent with the instructions. The instructions and data received in memory 1204 may optionally be stored on storage device 1208, either before or after execution by the processor 1202.

FIG. 13 illustrates a chip set or chip 1300 upon which an embodiment of the invention may be implemented. Chip set 1300 is programmed to determine roles for media generation and compilation as described herein and includes, for instance, the processor and memory components described with respect to FIG. 12 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1300 can be implemented in a single chip. It is further contemplated that in certain embodiments the chip set or chip 1300 can be implemented as a single "system on a chip." It is further contemplated that in certain embodiments a separate ASIC would not be used, for example, and that all relevant functions as disclosed herein would be performed by a processor or processors. Chip set or chip 1300, or a portion thereof, constitutes a means for performing one or more steps of providing user interface navigation information associated with the availability of functions. Chip set or chip 1300, or a portion thereof, constitutes a means for performing one or more steps of determining roles for media generation and compilation.

In one embodiment, the chip set or chip 1300 includes a communication mechanism such as a bus 1301 for passing information among the components of the chip set 1300. A processor 1303 has connectivity to the bus 1301 to execute instructions and process information stored in, for example, a memory 1305. The processor 1303 may include one or more processing cores with each core configured to perform independently. A multi-core processor enables multiprocessing within a single physical package. Examples of a multi-core processor include two, four, eight, or greater numbers of processing cores. Alternatively or in addition, the processor 1303 may include one or more microprocessors configured in tandem via the bus 1301 to enable independent execution of instructions, pipelining, and multithreading. The processor 1303 may also be accompanied with one or more specialized components to perform certain processing functions and tasks such as one or more digital signal processors (DSP) 1307, or one or more application-specific integrated circuits (ASIC) 1309. A DSP 1307 typically is configured to process real-world signals (e.g., sound) in real time independently of the processor 1303. Similarly, an ASIC 1309 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1300 includes merely one or more processors and some software and/or firmware supporting and/or relating to and/or for the one or more processors.

The processor 1303 and accompanying components have connectivity to the memory 1305 via the bus 1301. The memory 1305 includes both dynamic memory (e.g., RAM, magnetic disk, writable optical disk, etc.) and static memory (e.g., ROM, CD-ROM, etc.) for storing executable instructions that when executed perform the inventive steps described herein to determine roles for media generation and compilation. The memory 1305 also stores the data associated with or generated by the execution of the inventive steps.

Figure 14:
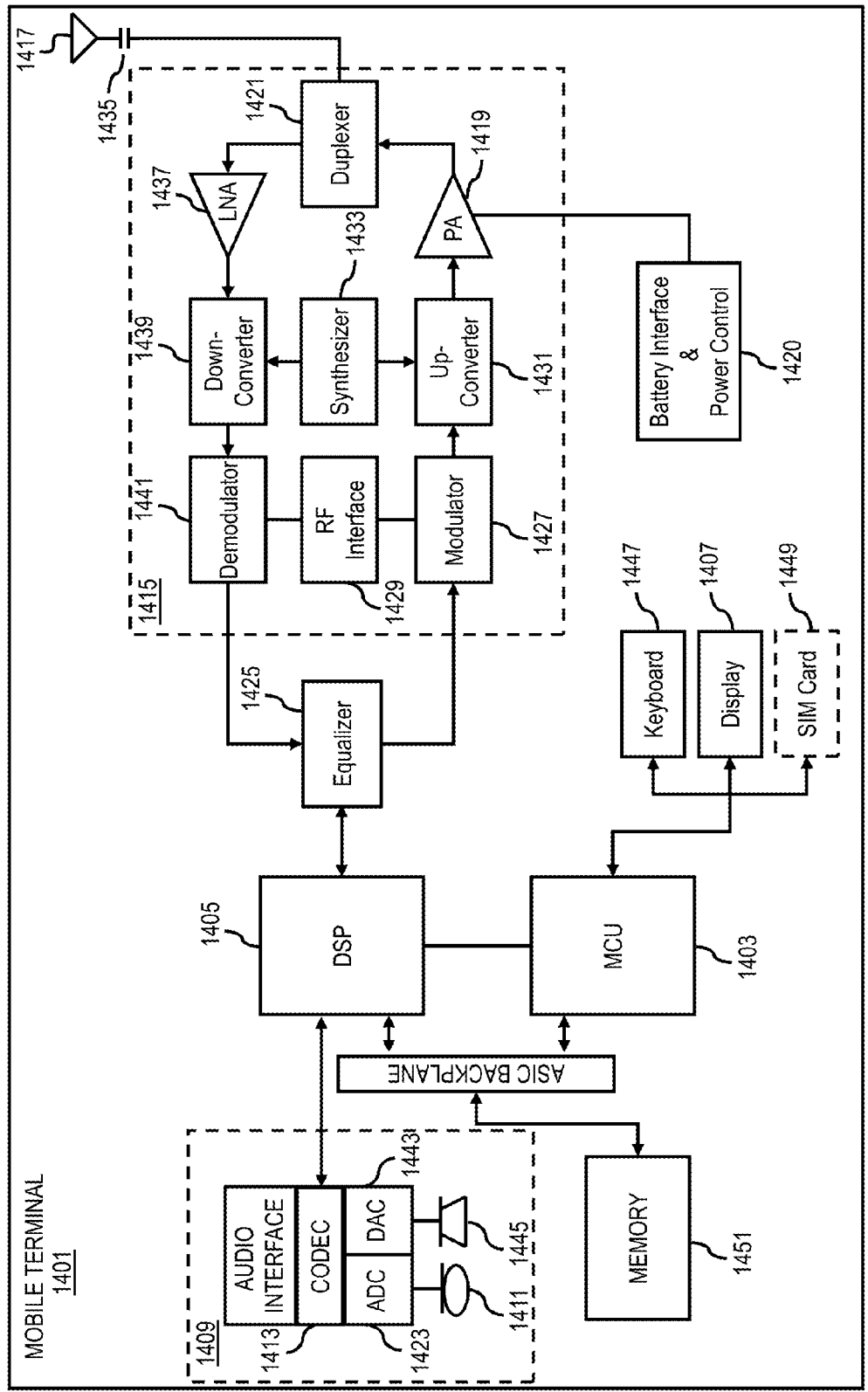
FIG. 14 is a diagram of a mobile terminal (e.g., handset) that can be used to implement an embodiment of the invention.

FIG. 14 is a diagram of exemplary components of a mobile terminal (e.g., handset) for communications, which is capable of operating in the system of FIG. 1, according to one embodiment. In some embodiments, mobile terminal 1401, or a portion thereof, constitutes a means for performing one or more steps of determining roles for media generation and compilation. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1403, a Digital Signal Processor (DSP) 1405, and a receiver/transmitter unit including a microphone gain control unit and a speaker gain control unit. A main display unit 1407 provides a display to the user in support of various applications and mobile terminal functions that perform or support the steps of determining roles for media generation and compilation. The display 1407 includes display circuitry configured to display at least a portion of a user interface of the mobile terminal (e.g., mobile telephone). Additionally, the display 1407 and display circuitry are configured to facilitate user control of at least some functions of the mobile terminal. An audio function circuitry 1409 includes a microphone 1411 and microphone amplifier that amplifies the speech signal output from the microphone 1411. The amplified speech signal output from the microphone 1411 is fed to a coder/decoder (CODEC) 1413.

A radio section 1415 amplifies power and converts frequency in order to communicate with a base station, which is included in a mobile communication system, via antenna 1417. The power amplifier (PA) 1419 and the transmitter/modulation circuitry are operationally responsive to the MCU 1403, with an output from the PA 1419 coupled to the duplexer 1421 or circulator or antenna switch, as known in the art. The PA 1419 also couples to a battery interface and power control unit 1420.

In use, a user of mobile terminal 1401 speaks into the microphone 1411 and his or her voice along with any detected background noise is converted into an analog voltage. The analog voltage is then converted into a digital signal through the Analog to Digital Converter (ADC) 1423. The control unit 1403 routes the digital signal into the DSP 1405 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1425 for compensation of any frequency-dependent impairments that occur during transmission though the air such as phase and amplitude distortion. After equalizing the bit stream, the modulator 1427 combines the signal with a RF signal generated in the RF interface 1429. The modulator 1427 generates a sine wave by way of frequency or phase modulation. In order to prepare the signal for transmission, an up-converter 1431 combines the sine wave output from the modulator 1427 with another sine wave generated by a synthesizer 1433 to achieve the desired frequency of transmission. The signal is then sent through a PA 1419 to increase the signal to an appropriate power level. In practical systems, the PA 1419 acts as a variable gain amplifier whose gain is controlled by the DSP 1405 from information received from a network base station. The signal is then filtered within the duplexer 1421 and optionally sent to an antenna coupler 1435 to match impedances to provide maximum power transfer. Finally, the signal is transmitted via antenna 1417 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1401 are received via antenna 1417 and immediately amplified by a low noise amplifier (LNA) 1437. A down-converter 1439 lowers the carrier frequency while the demodulator 1441 strips away the RF leaving only a digital bit stream. The signal then goes through the equalizer 1425 and is processed by the DSP 1405. A Digital to Analog Converter (DAC) 1443 converts the signal and the resulting output is transmitted to the user through the speaker 1445, all under control of a Main Control Unit (MCU) 1403 which can be implemented as a Central Processing Unit (CPU) (not shown).

The MCU 1403 receives various signals including input signals from the keyboard 1447. The keyboard 1447 and/or the MCU 1403 in combination with other user input components (e.g., the microphone 1411) comprise a user interface circuitry for managing user input. The MCU 1403 runs a user interface software to facilitate user control of at least some functions of the mobile terminal 1401 to determine roles for media generation and compilation. The MCU 1403 also delivers a display command and a switch command to the display 1407 and to the speech output switching controller, respectively. Further, the MCU 1403 exchanges information with the DSP 1405 and can access an optionally incorporated SIM card 1449 and a memory 1451. In addition, the MCU 1403 executes various control functions required of the terminal. The DSP 1405 may, depending upon the implementation, perform any of a variety of conventional digital processing functions on the voice signals. Additionally, DSP 1405 determines the background noise level of the local environment from the signals detected by microphone 1411 and sets the gain of microphone 1411 to a level selected to compensate for the natural tendency of the user of the mobile terminal 1401.

The CODEC 1413 includes the ADC 1423 and DAC 1443. The memory 1451 stores various data including call incoming tone data and is capable of storing other data including music data received via, e.g., the global Internet. The software module could reside in RAM memory, flash memory, registers, or any other form of writable storage medium known in the art. The memory device 1451 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1449 carries, for instance, important information, such as the cellular phone number, the carrier supplying service, subscription details, and security information. The SIM card 1449 serves primarily to identify the mobile terminal 1401 on a radio network. The card 1449 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising facilitating a processing of and/or processing (1) data and/or (2) information and/or (3) at least one signal, the (1) data and/or (2) information and/or (3) at least one signal based, at least in part, on the following:
at least one determination of one or more devices for generating one or more media items of at least one subject;
at least one determination of respective locations of the one or more devices relative to one or more focal areas of the at least one subject; and
at least one determination of respective roles for the one or more devices based, at least in part, on the respective locations,
wherein the respective roles are for at least generating the one or more media items.

2. A method of claim 1, wherein the (1) data and/or (2) information and/or (3) at least one signal are further based, at least in part, on the following:
at least one determination to generate a compilation of at least a portion of the one or more media items based, at least in part, on the respective roles.

3. A method of claim 1, wherein the (1) data and/or (2) information and/or (3) at least one signal are further based, at least in part, on the following:
at least one determination to signal the respective roles to at least one of the one or more devices; and
an input for selecting at least one of the respective roles,
wherein the determining of the respective roles is further based, at least in part, on the input.

4. A method of claim 3, wherein the at least one determination to signal the respective roles is performed before generating the one or more media items, while generating the one or more media items, or a combination thereof.

5. A method of claim 1, wherein the (1) data and/or (2) information and/or (3) at least one signal are further based, at least in part, on the following:
context information associated with the one or more devices,
wherein the determining of the respective roles is further based, at least in part, on the context information.

6. A method of claim 5, wherein the context information includes location information, orientation information, mobility information, information on device capabilities, information regarding the subject, data extracted from related content, historical role assignments, historical information regarding the subject, historical context information, information collected from one or more other devices, or a combination thereof.

7. A method of claim 1, wherein the (1) data and/or (2) information and/or (3) at least one signal are further based, at least in part, on the following:
at least one determination to sample at least a portion of content associated with the at least one subject; and
at least one determination to cause at least in part recognition of the at least a portion of the content,
wherein the determining of the respective roles is further based, at least in part, on the recognition of the at least a portion of the content.

8. A method of claim 2, wherein the (1) data and/or (2) information and/or (3) at least one signal are further based, at least in part, on the following:
at least one determination to store the compilation, the respective roles, or a combination thereof as template information.

9. A method of claim 2, wherein the (1) data and/or (2) information and/or (3) at least one signal are further based, at least in part, on the following:
one or more audio cues from the one or more media items,
wherein the compilation is further based, at least in part, on the one or more audio cues.

10. A method of claim 9, wherein the (1) data and/or (2) information and/or (3) at least one signal are further based, at least in part, on the following:
at least one determination of tempo information, mood information, audio structure information, or a combination thereof based, at least in part, on the one or more audio cues, audio information extracted from the one or more items, or a combination thereof;
wherein the compilation is further based, at least in part, on the tempo information, the mood information, the audio structure information, or a combination thereof.

11. A method of claim 10, wherein the (1) data and/or (2) information and/or (3) at least one signal are further based, at least in part, on the following:
at least one determination to sample at least a portion of the one or more audio cues, the audio information extracted from the one or more items, or a combination thereof; and
at least one determination of reference content based, at least in part, on a recognition of the at least a portion of the one or more audio cues, the audio information extracted from the one or more items, or a combination thereof,
wherein the tempo information, the mood information, the audio structure information, or a combination thereof is further based, at least in part, on the reference content.

12. A method of claim 10, wherein the (1) data and/or (2) information and/or (3) at least one signal are further based, at least in part, on the following:
at least one determination of a number of segments of the one or more media items to include in the compilation, one or more durations of the segments, one or more transitions between the segments, one or more edit points between the segments, or a combination thereof based, at least in part, on the respective roles, the tempo information, the mood information, the audio structure information, or a combination thereof.

13. A method of claim 1, wherein the at least one subject includes an event, a place, or a combination.

14. A method of claim 2, wherein the (1) data and/or (2) information and/or (3) at least one signal are further based, at least in part, on the following:
at least one determination of an overlap between one or more of the respective roles, a maximum coverage area of the subject, or a combination thereof,
wherein the at least one determination of the respective roles is further based, at least in part, on the overlap, the maximum coverage area, or a combination thereof.

15. An apparatus comprising:
at least one processor; and
at least one memory including computer program code for one or more programs,
the at least one memory and the computer program code configured to, with the at least one processor, cause the apparatus to perform at least the following,
determine one or more devices for generating one or more media items of at least one subject;

determine respective locations of the one or more devices relative to one or more focal areas of the event; and determine respective roles for the one or more devices based, at least in part, on the respective locations, wherein the respective roles are for generating one or more recordings of the event.

16. An apparatus of claim 15, wherein the apparatus is further caused to:

determine to generate a compilation of at least a portion of the one or more recordings based, at least in part, on the respective roles.

17. An apparatus of claim 15, wherein the apparatus is further caused to:

determine to signal the respective roles to at least one of the one or more devices; and receive an input for selecting at least one of the respective roles, wherein the determining of the respective roles is further based, at least in part, on the input.

18. An apparatus of claim 15, wherein the apparatus is further caused to:

determine to sample at least a portion of content associated with the event; and determine to cause at least in part recognition of the at least a portion of the content, wherein the determining of the respective roles is further based, at least in part, on the recognition of the at least a portion of the content.

19. An apparatus of claim 15, wherein the apparatus is further caused to:

determine one or more audio cues from the one or more recordings, wherein the compilation is further based, at least in part, on the one or more audio cues.

20. An apparatus of claim 15, wherein the apparatus is further caused to:

determine tempo information, mood information, audio structure information, or a combination thereof based, at least in part, on the one or more audio cues, wherein the compilation is further based, at least in part, on the tempo information, the mood information, the audio structure information, or a combination thereof.

* * * * *